United States Patent

[11] 3,523,513

[72] Inventors Curtis E. Maier
Riverside, Illinois;
Lee R. Ullery, Park Forest, Illinois; Paul
M. Erlandson, New Canaan, Connecticut
[21] Appl. No. 013,825
[22] Filed March 9, 1960
[45] Patented Aug. 11, 1970
[73] Assignee Continental Can Company, Inc.
New York, New York
a Corp. of New York

[54] CAN BODY AND METHOD OF FORMING SAME
49 Claims, 12 Drawing Figs.
[52] U.S. Cl. ..................................... 113/120,
138/171, 219/59
[51] Int. Cl. ..................................... B21d 51/26
[50] Field of Search ..................... 113/120A,F,N,
116DD, 33; 219/64, 59, 67, 81, 83; 83/6, 7, 8;
29/474, 475, 497.5, 480; 113/116Z, 121B; 138/171

[56] References Cited
UNITED STATES PATENTS

| | | | |
|---|---|---|---|
| 1,508,076 | 9/1924 | Taylor.......................... | 113/120 |
| 1,511,849 | 10/1924 | Taylor.......................... | 113/120 |
| 2,023,897 | 12/1935 | Neckerman.................. | 219/59 |
| 2,177,104 | 10/1939 | Gonser......................... | 113/120 |
| 2,444,463 | 7/1948 | Nordquist..................... | 113/120 |
| 2,444,465 | 7/1948 | Peters........................... | 113/120 |
| 2,455,785 | 12/1948 | Larson ......................... | 113/120 |
| 2,458,906 | 1/1949 | Himmel et al ............... | 153/32 |
| 2,484,854 | 10/1949 | Peters........................... | 113/120 |
| 2,774,857 | 12/1956 | Rudd et al .................... | 219/67 |
| 2,794,108 | 5/1957 | Park.............................. | 219/67 |
| 1,230,114 | 6/1917 | Gary.............................. | 219/81 |
| 1,684,169 | 9/1928 | Brueckner..................... | 219/81 |
| 2,078,546 | 4/1937 | Sebell........................... | 219/83 |
| 2,591,302 | 4/1952 | Schniff......................... | 219/81 |
| 2,693,632 | 11/1954 | Heussner...................... | 29/480 |
| 2,822,291 | 2/1958 | Hahn............................. | 113/33 |
| 2,886,691 | 5/1959 | Rudd............................. | 219/67 |
| 2,919,343 | 12/1959 | Rudd............................. | 219/67 |
| 2,927,371 | 3/1960 | Hays.............................. | 113/33 |

FOREIGN PATENTS
1,171,267 9/1958 France.

OTHER REFERENCES
Welding Handbook, Fourth Edition, Section 2 Chapter 30, pages 30-32 and 30-33; Published by American Welding Society, 1958 TS 227A5.

*Primary Examiner*— Richard J. Herbst
*Attorney*—Diller, Brown, Ramik & Holt

CLAIM:
1. A process of producing coated tubular welded seam can bodies comprising the steps of providing sheet metal in strip form and substantially of single can circumference width, shaping the sheet metal into tubular shape, guiding the tubular shaped sheet metal with the edge portions thereof being first disposed in spaced relation and then converging into overlapped relation, moving the tubular shaped strip through a welding zone and there electrically heating the edge portions of the tubular shaped sheet metal to a forge welding temperature as edge portions of the tubular shaped sheet metal converge into overlapping relation and forging the heated overlapped edge portions of the moving tubular shaped sheet metal to effect a welding together of opposed surfaces of the edge portions to form a welded seam tube and reduce the thickness of the metal along the seam to substantially the original thickness of the sheet metal and provide a seam weld wherein the original weld interface when considered in transverse section is rotated to a diagonal position relative to the surfaces of the sheet metal and the weld extends the full width of the interface, fluid treating the metal in the welding zone to reduce oxidation and discoloration of the metal and cool the welded seam area immediately subsequent to the forging operation to minimize distortion of the welded seam, applying a coating on at least a portion of at least one surface of the welded tube, and separating the welded tube into predetermined lengths.

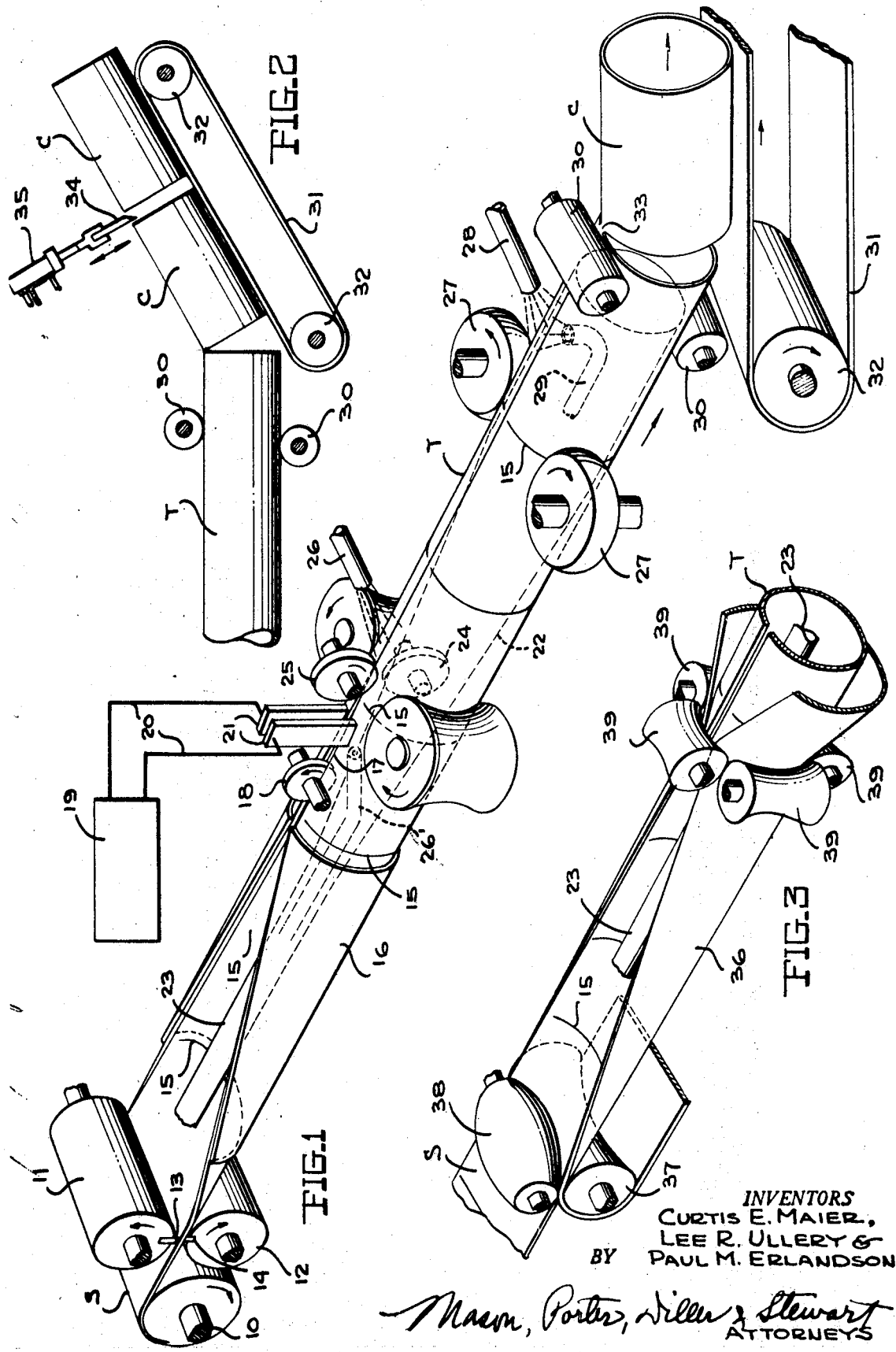

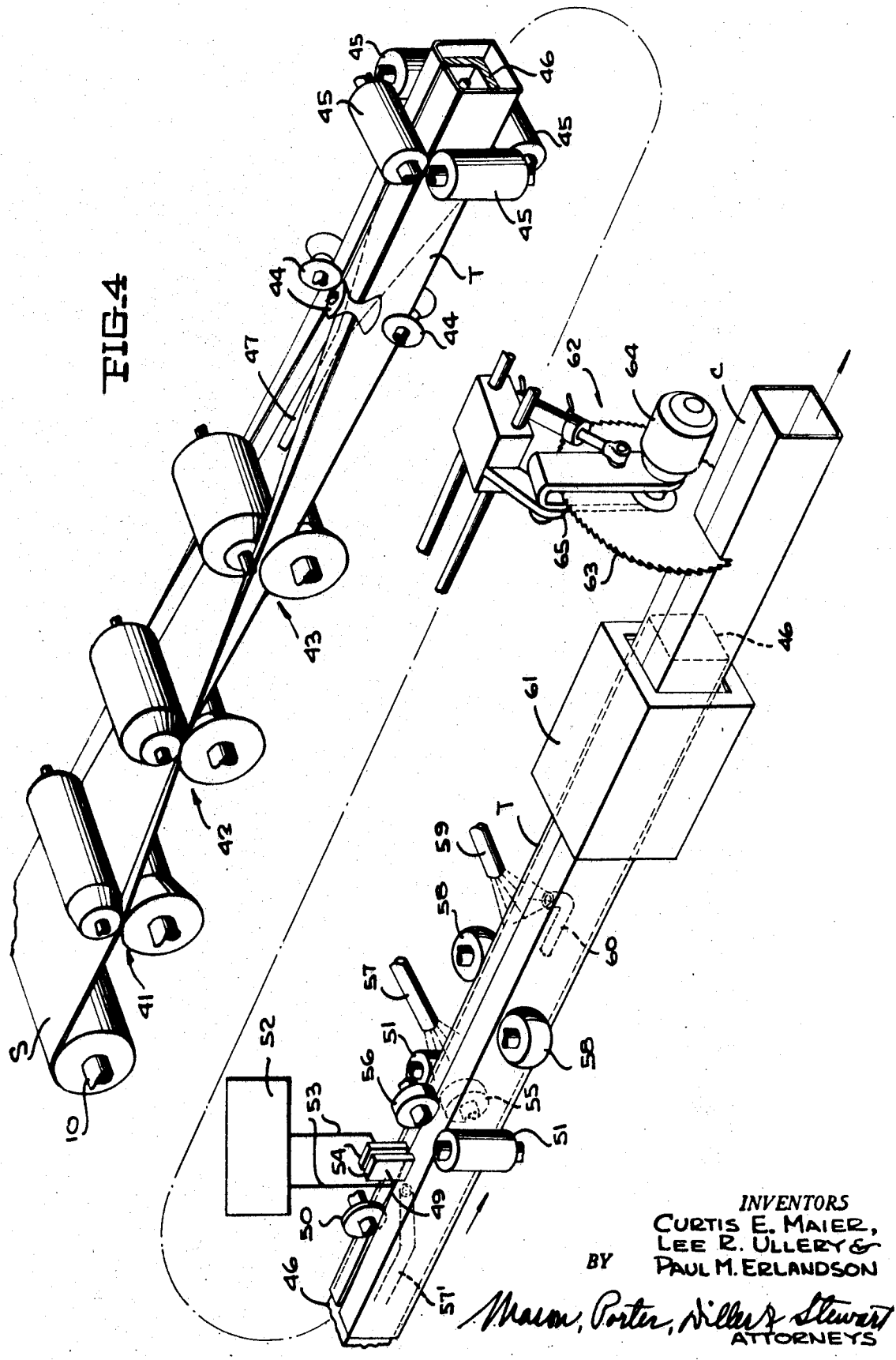

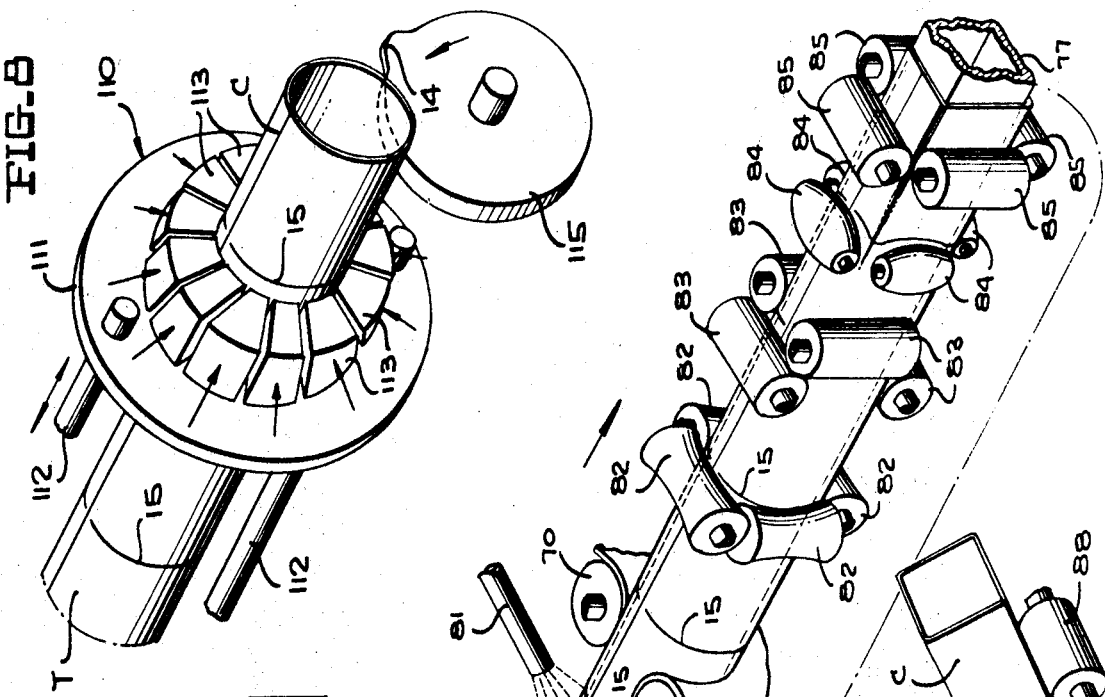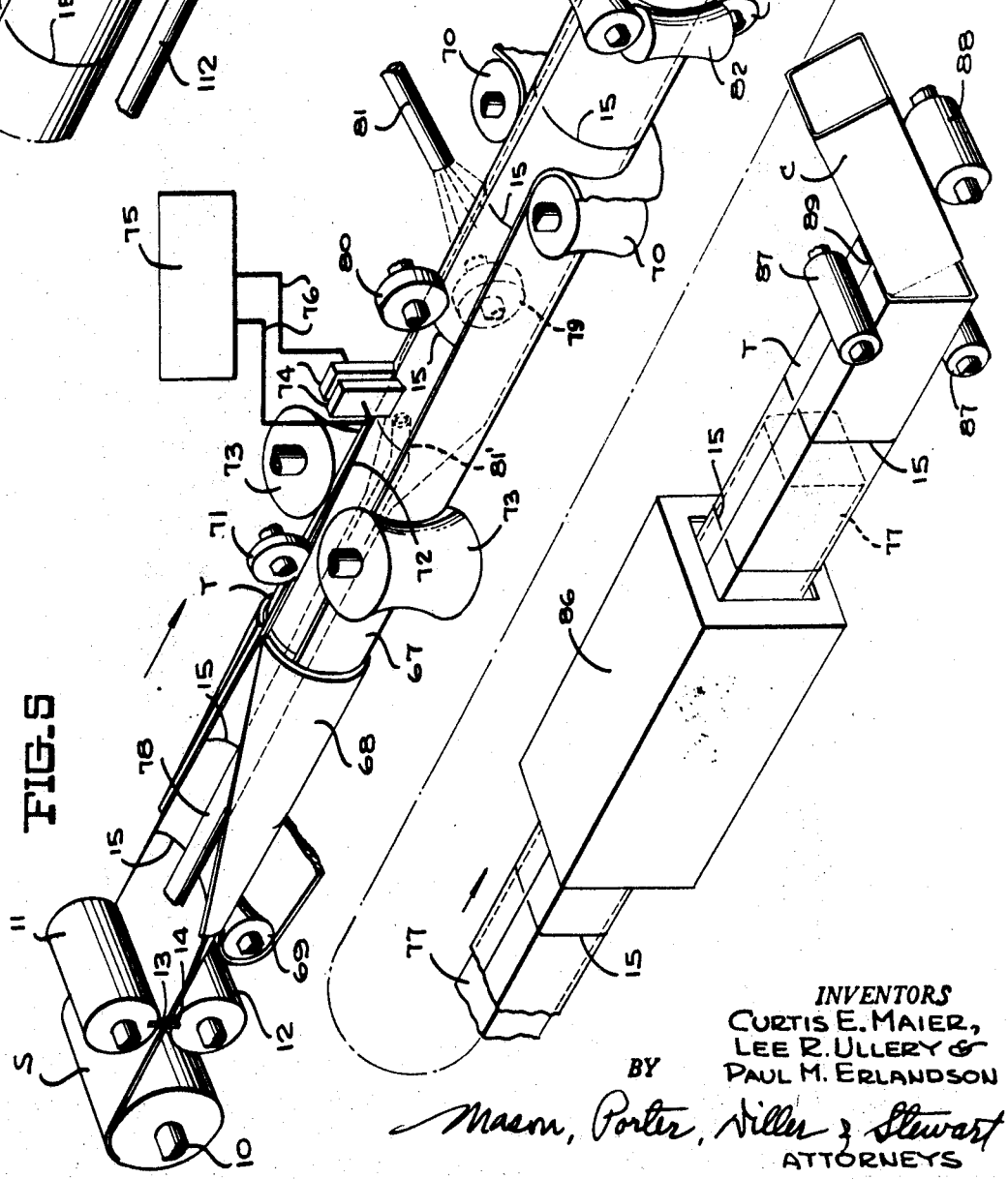

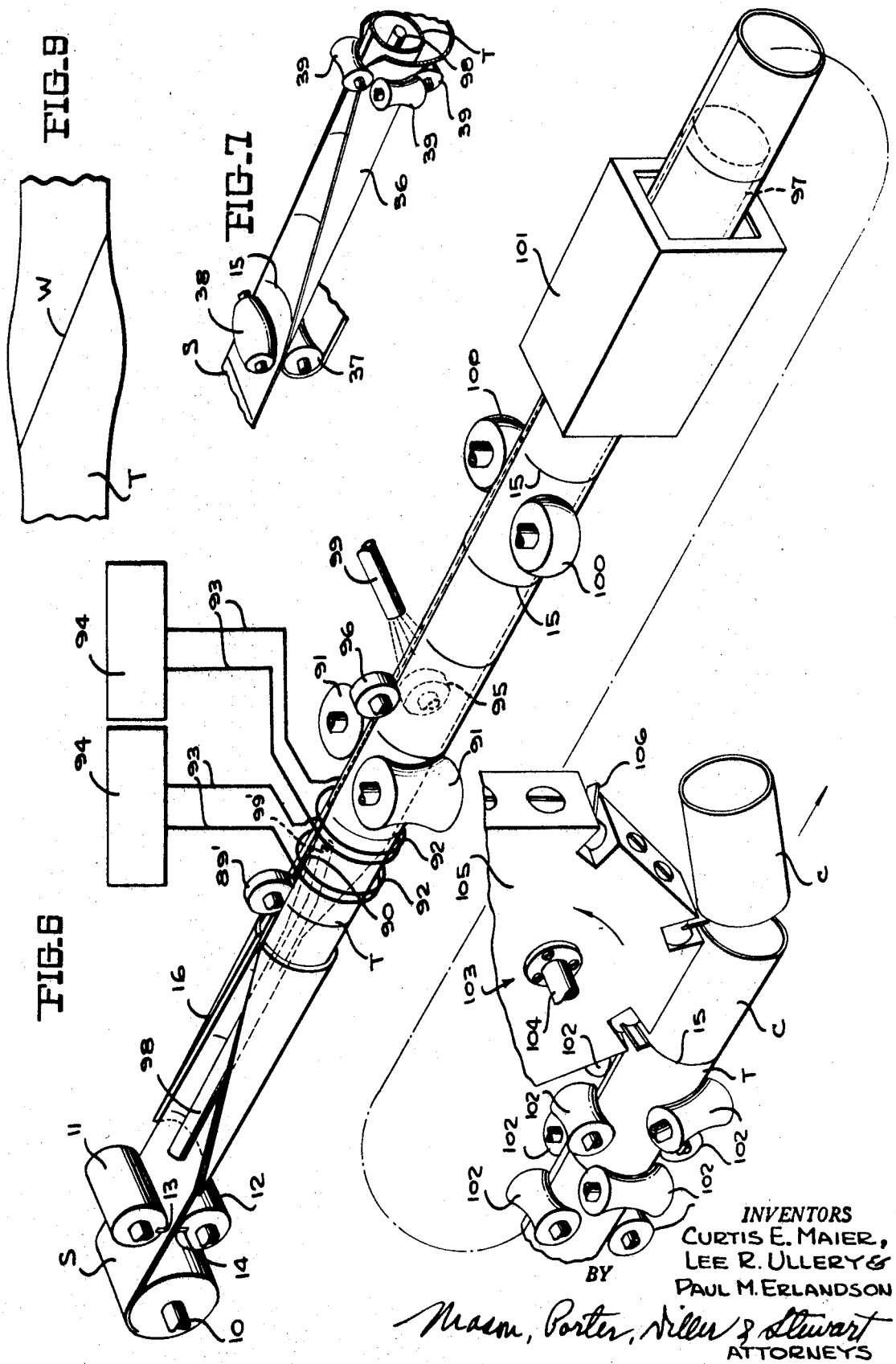

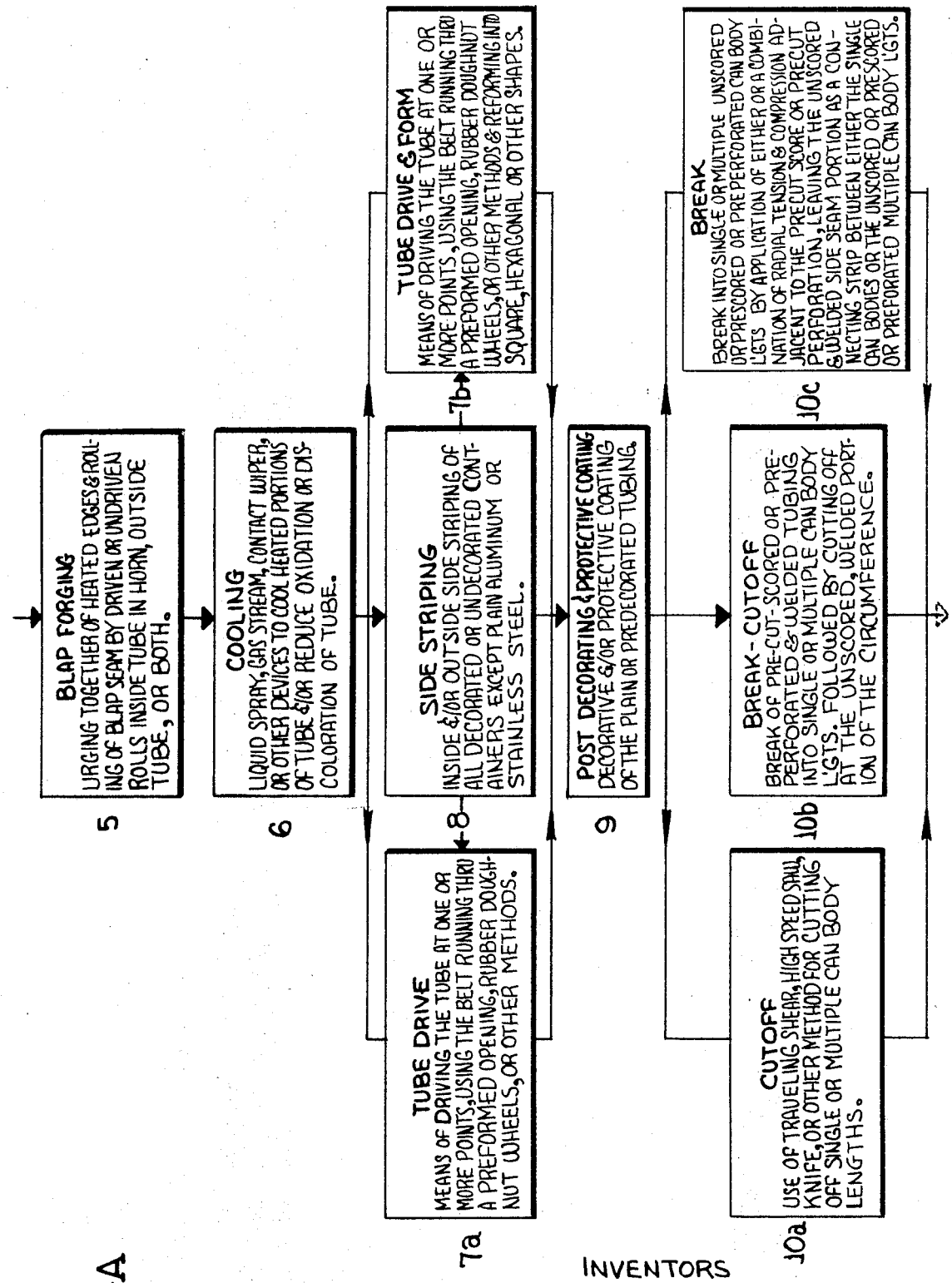

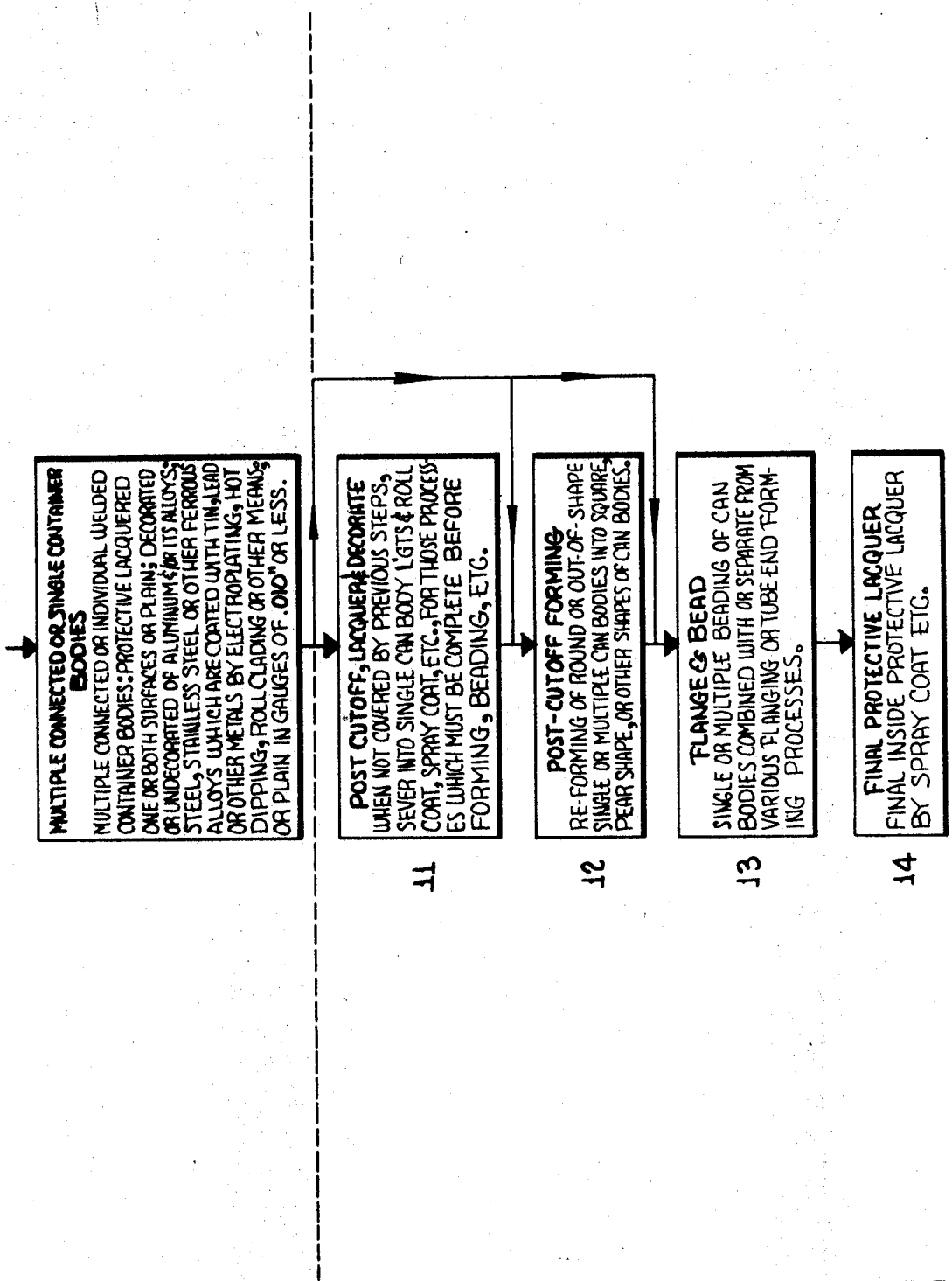

CAN BODY AND METHOD OF FORMING SAME

This invention relates in general to new and useful improvements in the art of can manufacture, and primarily seeks to provide commercially feasible processes for the manufacture of a tubular container body from metal coil stock in gauges of 0.010 inch or less wherein the coil stock is provided with a welded seam in the formation of the tubular container body.

Improvements in the manufacture of can bodies have occurred steadily since hermetically sealed cans were introduced over 150 years ago. Side seams in early processes were of the lap variety, soldered with tin or a 60/40 lead/tin alloy. While mechanically strong enough to resist without damage the high internal pressures developed in cans during termal sterilization of food products these had the serious disadvantage of exposing to the can contents an unprotected edge of bare steel which was subject to severe corrosion, even when the remainder of the body was tinplated. Sulfur-containing products reacted with the exposed iron to form black iron sulfide. Other chemical reactions could also occur, such as bleaching of the contents. Burrs on the inside cut edge added to the corrosion problem. Further, the corrosion products contaminated the can contents often, in the case of certain food products, making them unfit for consumption after a relatively short shelf life. Side seams, weakened by corrosion, developed leaks. Even the advent of lacquer coatings failed to solve the problem since it was difficult to cover the sharp edge adequately. Furthermore, no known commercial lacquer was, or is today, completely satisfactory for the protection of bare steel against the attack of oxygen and other agents, particularly in acid media.

It was to eliminate the exposed edge of bare steel that the lock seam was developed, using a lead/tin solder. As now used in combination with a short section of a lap seam at each end of the can body, in what is known as a lock-and-lap seam, only a small area of bare steel is exposed to the contents of a can. Corrosion and product contamination have been remarkably reduced as a consequence.

With the new lock-and-lap seam construction, however, came a number of other problems. A locked seam is not as strong as a lapped one and additional metal is employed, raising raw materials cost by several percent. With carbonated beverages and some other products which involve unusual thermal sterlization, it is necessary to revert in part to a lap construction with its disadvantages enumerated above to achieve the strength necessary to resist the internal pressurers developed. This is likewise the case with aerosol containers which are pressurized to above 100 pounds per square inch.

Machinery to form lock-and-lap seam bodies at high speed must be precision made of special materials, including carbide-tipped dies, at a very substantial capital investment. Specifically, the clearances and dimensional tolerances in some parts approach those of the finest watches, calling for manufacturing skills of the highest order. The need for complicated synchronization of numerous motions is a drawback. Maintenance and change-over for different-sized bodies both necessitate the services of highly skilled and experienced mechanics. Down-time is costly. Engineering and materials costs are likewise high.

With any of these can constructions, the cost of solder and flux is substantial and their use requires additional expensive maintenance schedules because of the corrosive nature of soldering flux. In addition, blower devices must be installed to reduce the annoyance and corrosive effects of fumes and dust.

The speed of conventional bodymakers is now limited by the rate at which discontinuous motions of heavy machine parts can be repeated. It is thus advantageous to employ a continuous process in order to increase the production speed further.

For the diverse uses to which metal cans are now put, it is desirable to be able to form these of many different metals and combinations of metals. These include base metals and their alloys, such as mild steel, stainless steel, aluminum and aluminum alloys, copper and copper alloys, zinc and zinc alloys, magnesium and magnesium alloys. The combinations of metals include mild steel coated with hot dipped or electroplated tin, hot dipped or electroplated lead, hot dipped or electroplated tin/lead alloys, hot dipped, electroplated, metallized or clad aluminum and its alloys, metallized or clad stainless steel, electroplated, metallized or clad nickel, electroplated or metallized chromium, hot dipped, electroplated or metallized zinc, metallized or clad zirconium, metallized or clad titanium.

Many of these materials, however, are difficult and even impossible to solder in commercially reliable processes. Even tin-plated steel, when the tin coating is very thin, offers difficulties, particularly in recessed regions where the flux does not penetrate and wet the surface.

To remedy these many defects numerous attempts over the past twenty-five years have been made by can and equipment manufacturers to produce high-quality can bodies by resistance welding. Yet, until the present invention, none of these proved to be commercially feasible and economic. In most of these attempts, bodies were welded one-at-a-time using power frequencies, typically 60 cycles per second. The body edges in these low-frequency resistance welding processes must be extremely clean and free of oxide, requiring a preparatory treatment such as by pickling with acid, followed by rinsing and drying. Even with a presumably clean surface, sparking at the electrodes was often severe, resulting in localized hot spots and rapid deterioration of the costly electrodes.

Since welding the full height of a can body at one time presented numerous mechanical and electrical problems, the weld was preferably made starting at one end and continuing to the other. Unless the rate of travel of the blank was variable or the power input was adjusted by a complicated timing mechanism phased with the arrival of the body blank, the starting end did not weld because it was too cold and the stopping end was overwelded.

In another prior process, the seam was welded by a succession of capacitor-discharge pulses. These produced bodies with the defect known as "skip welding" whereby it was not always possible to eliminate gaps in the weld with assurance of making the can body free from leakage.

In all of the above methods, bodies are handled one-at-a-time which leads to the need for complicated, massive and relatively discontinuous-motion machines with their attendant vibration and noise. In contrast, the invention described herein employs an economically feasible continuous, high-speed process without rapid starting and stopping motions. The equipment is basically of light construction and quiet in operation. Great savings from the elimination of solder and flux, elimination of the excess of metal necessarily used in either the lap or lock-and-lap side-seam structure and by the use of thinner metal, since the strength of the welded side-seam approaches the strength of the metal itself, being much stronger than a can with a lap or lock-and-lap soldered side-seam. Further savings are a consequence of being able to make cans with welded side-seams continuously at much higher speeds and therefore at substantially lower cost.

This invention proposes to provide a continuous line wherein metal stock may be provided in coil or strip form and through a continuous operation the metal stock will be first shaped in the form of an elonagated tube after which the tube will be separated into individual can bodies, the nature of the line being such that each can body will be completely formed and decorated, as well as protectively coated, as is desirable, in a continuous operation.

Another object of the invention is to provide coil stock or strips in single container circumference widths which may be protective-lacquered on one or both sides, decorated or undecorated, or in certain instances plain, depending upon the particular metal utilized, the stock being formed of base metals and their alloys or combinations of metals, in gauges of 0.010 inch or less, and to shape the metal stock into tubular form through steps including side seam welding, provide the tubular container body stock with the desired finish, reshaping the tubular container body stock as desired, and then separating the tubular container body stock into individual container bodies in a single line.

A further object of the invention is to provide a continuous manufacturing line wherein any metal stock which is suitable for the formation of container bodies is provided in coil or strip form in single container circumference width, which stock may be protective-lacquered or plain, or decorated on one or both sides, or undecorated, as desired, and which metal stock or strip is operated on in the line to first shape it into tubular form, after which it is suitably guided to have the edges of the unseamed tube properly disposed for heating and welding together thereof, after which the welded edges are forged by overlapping the edges at the time of welding to provide a blap seam, which seam is a seam having a generally indiscernable diagonal juncture, the seam then being fluid treated to both rapidly cool the heated portions of the tube and reduce oxidation and discoloration thereof, after which, if desired, the tube may be reshaped to have other cross-sections, such as square or hexagonal, the tube then being provided with any desired decorative or protective coating, or both, after which can bodies are separated from the continuous tube either individually or in multiple connected units.

Still another object of the invention is to provide a novel can line wherein the metal stock is provided in the form of a coil or strip in single container circumference width, the metal stock being of a thickness of 0.010 inch or less, and the metal stock being of any desired metal suitable for the forming of can bodies, and provided with any desired surface coating, the stock being suitably guided into a tubular shape by any type of tube shaping apparatus which may bring the strip to a circular cross-sectional shape with elastic stresses still present so that it would exhibit springback upon release, or overform the strip so that upon springback, it would assume the desired circular shape, after which the unseamed tube is suitably guided so that the edges thereof are properly aligned for heating and subsequent welding, the tube then being heated utilizing one of several alternative heating means which may include alternating current and induction coils, high frequency A.C. or pulses and capacitive electrodes, and D.C., A.C. or pulses with conductive electrodes, applied to the strip, all of which will cause current flow in selected portions of the tube for heating the tube to the necessary welding temperature, after which, in the case where the edges of the unseamed tube are overlapped, the tube may be forged in the seam area to shift the interface or juncture of the weld to a diagonal position, thus forming what is referred to as a blap weld, after which the welded area may be rapidly cooled by means of a liquid spray, gas stream, contact wiper, etc., and at the same time, reduce oxidation and discoloration of the tube, the tube then being reshaped, if desired, to shapes other than circular in cross-section, after which the tube may be side striped, either inside or outside, or both, along the welded seam, after which the tube may be provided with a decorative and/or protective coating, and finally, the tube is separated into either indivual or multiple connected container bodies by a suitable cut-off means or a suitable break-off means, the break-off means being used when the stock is previously weakened at intervals of can body lengths by perforation or scoring on both or one side thereof, the resultant product being in the form of multiple connected or single container bodies which may be protective-lacquered on one or both surfaces or plain, decorated or undecorated, and formed of suitable base metals and their alloys or combinations of metals in gauges of 0.010 inch or less, which container bodies may then be, if necessary provided with container body coatings and decorations, may be reshaped as desired, and then provided with a flange and such beading as is necessary prior to the application of a final protective lacquer coating on the inside thereof.

Another object of the invention is to provide a novel process of producing can bodies and comprising the steps of providing sheet metal in strip form and of .010 inch maximum thickness and substantially of single can circumference width, weakening the strip at a selected unit multiple of can body length intervals transversely of the strip, guiding the strip into a desired tubular shape and confining it in said shape while preventing springback of the strip towards its initial strip form, guiding the tubular shaped strip to present the edge portions thereof first in spaced relation and then converging into overlapped relation with the width of overlap being no greater than five times the thickness of the sheet metal, moving the tubular shaped strip through a welding zone and there electrically heating the edge portions of the tubular shaped strip to a forge welding temperature as edge portions of the tubular shaped strip converge into overlapping relation and forging the heated overlapped edge portions to effect a welding together of opposed surfaces of the edge portions to form a welded seam tube and reduce the thickness of the metal along the seam to substantially the original thickness of the sheet metal and provide a seam weld wherein the original weld interface when considered in transverse section is rotated to a diagonal position relative to the surfaces of the sheet metal, fluid treating the metal in the welding zone to reduce oxidation and discoloration of the metal and cool the welded seam area immediately subsequent to the forging operation to minimize distortion of the welded seam, applying to the tube a driving force effective to impart the before-mentioned sheet metal movement, applying a coating on at least a portion of at least one surface of the welded tube, breaking the tube at certain selected locations at which the strip was weakened to partially separate selected unit multiple of can body length and leave unbroken tabs connecting said partially separated lengths, separating said lengths through said tabs, and reshaping the separated lengths.

Another object of the invention is to provide a novel process of the character stated wherein there is included the step of driving the metal strip while it is being guided into the desired tubular shape and confined against springback towards its initial strip form.

Another object of the invention is to provide a novel method of the character stated wherein in lieu of reshaping individual can bodies the can bodies remain connected by the connecting tabs during the reshaping operation, after which the can bodies are separated by disconnection of the connecting tabs.

Another object of the invention is to provide a novel method of the character stated wherein there is included the step of applying decorative matter externally to the separated tube lengths prior to the reshaping thereof. Another object of the invention is to provide a novel process of producing can bodies and comprising the steps of providing sheet metal in strip form and of .010 inch maximum thickness and substantially of single can circumference width, weakening the strip at a selected unit multiple of can body length intervals transversely of the strip, driving the strip while guiding the strip into a desired tubular shape and confining it in said shape while preventing springback of the strip towards its initial strip form, guiding the tubular shaped strip to present the edge portions thereof first in spaced relation and then converging into overlapped relation with the width of overlap being no greater than five times the thickness of the sheet metal, moving the tubular shaped strip through a welding zone and there electrically heating the edge portions of the tubular shaped strip to a forge welding temperature as edge portions of the tubular shaped strip converge into overlapping relation and forging the heated overlapped edge portions to effect a welding together of opposed surfaces of the edge portions to form a welded seam tube and reduce the thickness of the metal along the seam to substantially the orginal thickness of the sheet metal and provide a seam weld wherein the orginal weld interface when considered in transverse section is rotated to a diagonal position relative to the surfaces of the sheet metal, fluid treating the metal in the welding zone to reduce oxidation and discoloration of the metal and cool the welded seam area immediately subsequent to the forging operation to minimize distortion of the welded seam, applying a coating on at least a portion of at least one surface of the welded tube, breaking the tube at certain selected locations at which the strip was weakened to partially separate selected unit multiple of can body length and leave unbroken tabs connecting said partially separated lengths, separating said lengths through said tabs, applying decorative matter exteriorly on the separated lengths and reshaping said connected lengths.

Another object of the invention is to provide a novel process of the character stated wherein there is included the step of reforming the welded tube to a cross section other than the orginal cross section of the tube.

Another object of the invention is to provide a novel method of the character stated wherein there are included the steps of overforming the strip during the tubular shaping thereof and permitting it to spring back to and remain form retaining in the desired tubular shape, and severing the tube at a selected multiple of can body length intervals.

With the above, and other objects in view that will hereinafter appear, the nature of the invention will be more clearly understood by reference to the following detailed description, the appended claims, and the several views illustrated in the accompanying drawings.

IN THE DRAWINGS:

FIGURE 1 is a schematic perspective view showing a first form of line and process for forming container bodies in a continuous operation utilizing coiled metal stock.

FIGURE 2 is a fragmentary elevational view showing the tail end of a similar line wherein in lieu of leaving the container bodies connected together by connecting strips, the connecting strips are cut to form individual container bodies.

FIGURE 3 is a fragmentary perspective view showing a modified form of head end for the container body line of FIGURE 1, and shows a modified means for shaping the metal stock into tube form.

FIGURE 4 is a schematic perspective view showing a modified form of can line and process wherein individual container bodies are formed in a single continuous operation from a metal strip which is provided in coil form.

FIGURE 5 is schematic perspective view of another can line and process for forming container bodies in a continuous process wherein the cross-section of the tubular container body stock is changed.

FIGURE 6 is a perspective schematic view of still another can line and process for making individual container bodies from elongated strip of metal stock in a continuous operation wherein a welded seam tubular container stock is first formed.

FIGURE 7 is a fragmentary perspective view showing a portion of the head end of the can line of FIGURE 6, utilizing a modified apparatus for shaping the metal stock into the tubular form.

FIGURE 8 is a fragmentary perspective schematic view of a modified apparatus for breaking the tube along the weakening lines thereof.

FIGURE 9 is an enlarged fragmentary schematic view, showing the typical formation of a welded seam construction of the type which is commonly referred to as a blap weld.

Figure 10:
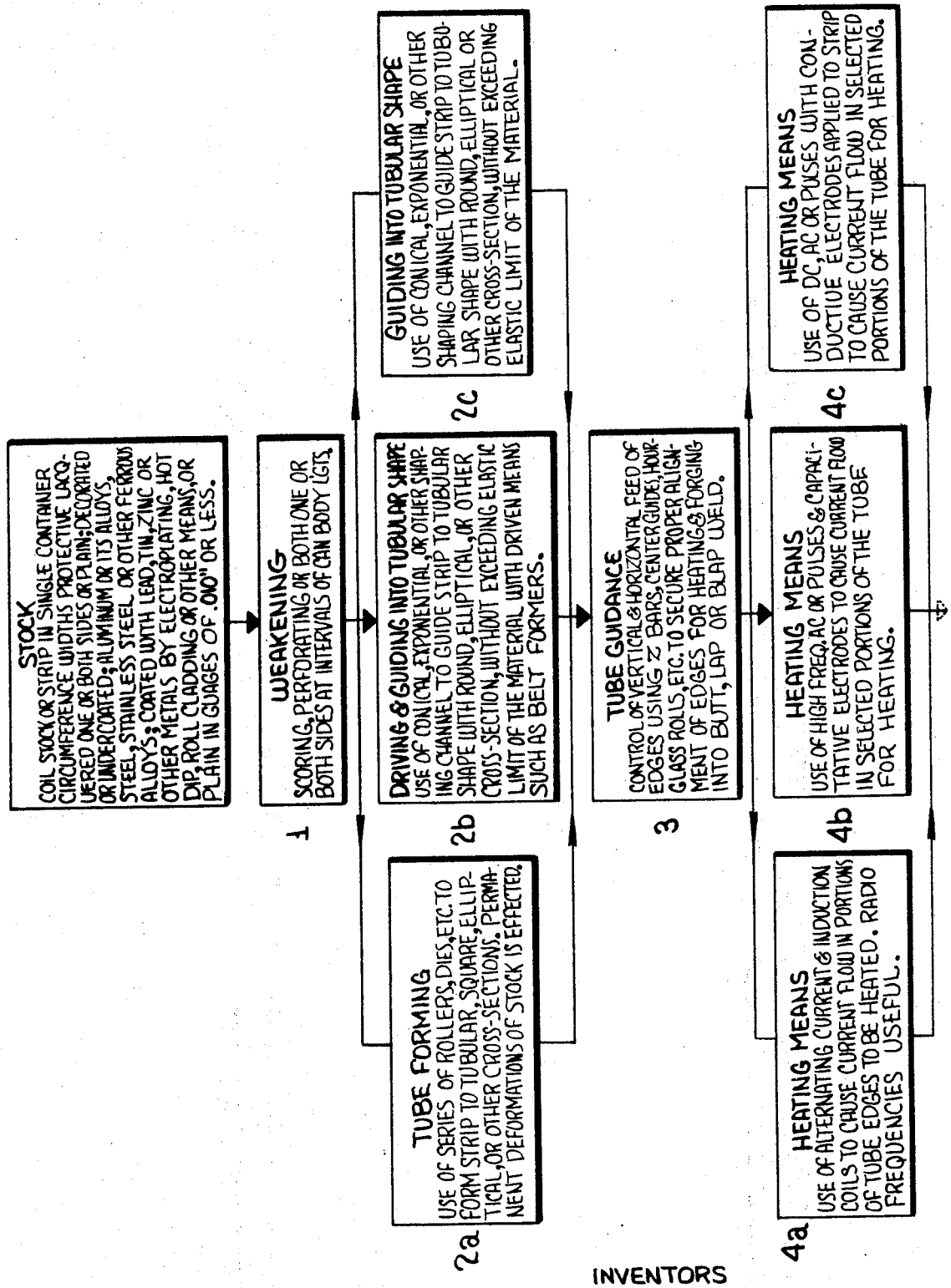

FIGURES 10, 10A and 10B combined show a block diagram of the various processes which may be followed in manufacture of tubular container body stock in accordance with the invention.

The present invention proposes to start with metal stock in coil or strip form and in a continuous operation through one of several commercially feasible processes, to provide a container body which is equal to or better than in quality presently made container bodies, and which container bodies may be made at a much lesser cost. Each of the several processes involves the formation of an unseamed tube which is then welded to form a tubular container body stock from which individual container bodies may be separated.

The several processes of manufacture of tubular container body stock, as proposed in accordance with this invention, follow the same general sequence, with several alternatives and the possibility of omissions of certain of the steps of the processes. In view of this, reference is first made to the block flow diagram of FIGURES 10, 10A and 10B wherein the various processes may be readily followed.

Each of the processes starts with metal stock which may be provided either in coil form or in strip form, the metal stock being of single container circumference width and being of thickness of 0.010 inch or less. The metal stock may be provided with a protective lacquer coating on one or both sides, or may be plain. Also, the metal stock may be decorated or undecorated, as is desired. Although lacquer has been mentioned, it is to be understood that the coating may be of such materials as enamels, resins, lacquers, etc. The protective coatings may be applied in conventional manners with such well known units as roll coaters, spraying systems, both with a gaseous drive medium and of the non-gas type, such as spinning disks, electrostatic systems and the like. It is also anticipated that the decorative coating may be applied utilizing so-called printing processes including rotogravure, lithographing, etc.

The metal stock may be formed of the metals and combinations of metals referred to herein above.

The first step in many of the processes is to weaken the metal stock at intervals of single or multiple can body lengths by scoring or perforating with the scoring being performed on both sides or one side only of the stock. It is to be understood that the stock is weakened transversely of its length, and that the weakened area terminates short of the edges thereof so as not to extend into the welded seam which is to be formed.

In each of the several processes, the second step is to form an unseamed tube from the metal stock. The unseamed tube may be formed through the use of a series of rollers, dies, etc., to form the strip to tubular shape of round, square, elliptical or other cross-sections, and sufficient over-forming is accomplished so that, after springback, the cross-section has the desired shape. On the other hand, the tube may be formed through the use of conical, exponential and other shaping channels to guide the strip to tubular shape with round, elliptical and other cross-sections without over-forming so that if released by the driving and/or guiding means, springback would occur and the desired cross-sectional shape would not be maintained. If desired, belt drive or shaping means to reduce friction and drag may be incorporated in the tube shaping apparatus, and the belt will function as the tube shaping guide.

Of the two aforementioned methods of providing a tubular shape, preference is given to the second method where no over-forming is performed but instead, the tube is brought to shape and held with elastic springback prevented by the tube shaping or guiding means. When springback is allowed to occur, the overforming must be done quite precisely in order subsequently to have the desired shape and since springback varies greatly with thickness of the strip material, its yield strength and the radius of curvature or tube diameter, any change of these characteristics would require a change of the forming tools. On the other hand, if springback is not permitted to occur, the same shaping means can be used for quite a range of strip materials having varied yield strengths and varied thicknesses within the range 0.004″ to 0.010″.

A second potential advantage of bringing the strip material to a tubular cross-sectional shape without overforming appears in the stress state in a circumferential direction within the tubing after welding is complete. This preferred method of tube shaping results in a welded tube having elastic circumferential tensile stresses on the exterior and elastic compressive stresses on the interior as demonstrable by cutting a welded tube which was so shaped along the tube wall in an axial direction. Such a tube will open up by reason of the restrained elastic springback stresses. It is well known that the alternative overformed tube, in contrast, has residual elastic circumferential tensile stresses on the interior and compressive stresses on the exterior. Since the tube, when used for containers, may contain acid foods and equivalently corrosive products and since stress-corrosion failures are always induced by tensile stresses and since certain alloys, particularly of aluminum, are strongly susceptible to stress-corrosion failures, the tube shaping method which results in an internal elastic compressive stress is preferred.

The third broad step in the several processes is the guidance of the tube prior to welding of the seam. The edges of the tube which are to be welded together have the vertical and horizontal feeding thereof controlled utilizing Z-bars, center guides, hourglass rolls, etc., to secure proper alignment of the edges for heating and forging into butt, lap or blap welds. At this time, it is pointed out that it is necessary to control the relative relations of the edges of the unseamed tube to a very fine degree, otherwise, the desired welded seam will not be produced.

In the welding of the edges of the unseamed tube to form the seamed tube or tubular metal container body stock, it is proposed to produce the desired welding temperature in the edges of the tube by causing the flow of current in selected portions of the tube for heating the same. Several alternative forms of heating means are proposed. For example, alternating current and induction coils can be used to cause the desired current flow. It has been found that ordinary induction heating will produce the desired welding effect by passing a current through a 2-turn water-cooled coil of copper tubing surrounding the formed tube in advance of the welding point. Currents are passed through this coil preferably through a radio frequency matching transformer at a frequency of 450 kc for iron-base stocks and at other frequencies which are suitable to the base metal, with the power used being less than 100,000 watts and more than 5,000 watts, depending upon the speed of the advancing material, the thickness of the material to be welded, etc. Although radio frequencies are useful, it is contemplated that lower frequencies may be utilized.

A second form of heating means makes use of high frequency A. C. or pulses and capacitive electrodes to cause the desired current flow in selected portions of the tube for heating. In utilizing heating with capacitative coupling, in order to achieve a very narrow heated zone adjacent to the lap, butt or blap seam, it is proposed to utilize higher frequencies than 450 kc. Several advantages are derived from such frequencies. At higher frequencies, for example, 100 Mc, the area of a single parallel plate capacitor having a capacitive reactance small enough to permit efficient coupling is achievable as forming a part of an electrode surface. The use of capacitive contacts allows the dielectric material such as "Mylar," "Teflon," polystryrene, and the like, to be placed in contact with the tube rather than conductive electrodes, which must be made of metallic materials. In the formation of a weld, as the edges of the tube move together toward the welding point, they define a V. The energy coupled into the V may be coupled so that a maxium voltage and minimum current point will be located one-quarter way back of the V, which will act in the manner of a tapered shorted transmission line. At the closed end of the V, there will be a point where the current is a maximum and the voltage a minimum. The V itself may be considered to act as an impedance transformer, and the feed will be at the high impedance point. Frequencies in excess of 100 Mc can, of course, be generated efficiently. It is also proposed to use D.C., A.C. or pulses with conductive electrodes applied to the strip to cause current flow in selected portions of the tube for heating. The electrodes will be applied to the advancing unseamed tube at points preferably prior to the confluence of the heated edges. In this type of heating, frequencies ranging from 50 to 900 kc may be utilized, although it is possible to obtain the necessary welding heat utilizing either higher frequencies or frequencies as low as 5 kc.

Immediately subsequent to the heating and welding together of the edges of the unseamed tube, it is proposed to forge this seam. Although advantages are obtained by forging both the butt and lap seams, if a lap type of seam is formed and sufficient pressure is applied to shift the interface of the weld from a generally tangential position to a diagonal position to form a blap weld, a much more desirable weld is formed. The forging may be accomplished by means of rolls which are disposed inside the tube in the normal forming horn, outside the tube, or both, with the rolls being selectively driven or undriven. The rolls may be formed of either metallic or ceramic materials, and may be in the form of two rolls opposing each other, or the inner roll may be reinforced by a plurality of rolls disposed in stacked relation. Pneumatic and hydraulic pressures have been used to control the pressure exerted upon the heated seam.

Immediately subsequent to the forging operation an oxidation-preventing coolant is applied such as by spraying or with a contact wiper, to the inside, the outside or to both the inside and outside of the welded seam. This coolant may be any one or a combination of various substances such as nitrogen, water, carbon dioxide, helium, certain petroleum products, or the gas from a commercial "inert gas" generator. The cooling of the heated seam results in the reduction of mechanical wrinkling or other distortion of the tube due to thermal stress distributions. Also, the cooling of the tube results in the reduction of discoloration due to oxidation of various materials, such as steel or tin plate.

After the seam of the tube has been cooled, in certain instances, it may be desired to side stripe the seam area, either inside or outside, or both. However, this normally would not be required in the case of aluminum and stainless steel tubes.

Subsequent to the cooling operation the tube driving means for pulling the coil stock or strip through the forming means and welding station is applied. This driving means may include the use of a belt running through a preformed opening, rubber doughnut wheels, etc. On the other hand, it may be desirable to reshape the tube into square, hexagonal and other shapes at this point. The reshaping of the tube may be in co-operation with the driving thereof.

In the event it is desired to provide for the decoration or coating of the tube at this point in lieu of coating or decorating the coil metal stock material, this may be carried out. The coating of the tube, both interiorly and exteriorly, may be performed by spraying devices or coating rolls, and the decoration may be accomplished by external printing rolls. It is also pointed out that when a precoated or predecorated tubing is employed, it may be desirable to complete the coating or decoration, or modify the same at this point.

In the event the first step of weakening the metal stock prior to the formation of the tube has been omitted, the tube may now be cut off in single or multiple can body lengths by the use of a traveling shear, high speed saw, knife, etc. Also, extremely high speed fixed cutting devices, such as blades actuated by magnetostriction devices which operate within extremely short time intervals may be utilized.

When the stock is weakened as mentioned in the first step, prior to the formation of the tube, the individual container bodies may be broken apart. However, since the weakened area does not extend to the edges of the tube blank, the individual container bodies will be connected together by the unscored and welded portion which functions as a connecting strip. The break-off of the individual container bodies may be accomplished in numerous manners which may include the combination of radial tension and compression of the tube. The tube may be squeezed, twisted, or the line of direction of travel may be changed.

In certain instances it may be desirable to cut off the connecting strip between individual container bodies at this time or spaced ones of the connecting strips may be cut to provide units of two or more container bodies. This may be accomplished in many ways, including the use of a simple knife, a burner arrangement, etc.

The result of the individual processes is the formation of a multiple connected or single container bodies having welded seams and which are protective lacquered on one or both surfaces, if desired, decorated or undecorated, as desired, and formed of metals such as the metals and combinations of metals referred to hereinabove, and the gauge of the container bodies being in the vicinity of 0.010 inch or less.

The single or multiple container bodies referred to may be provided by mere cutting through of the welded tube at the single or mutiple body length locations, or by breaking through of body length defining weakened lines, either at each line defining the end of a single body length, or at selected lines only to determine a breaking off of a predetermined plurality of body lengths. The breaking through of the weakened lines at selected positions as aforesaid may be such as to bring about complete severance, or the break may be discontinuous at the location of the weld seam line so as to leave integral tabs connecting the single or plural length break-away sections. Such connecting tabs may be cut through coincidentally with the break-away action, or the severance through the connecting tabs may be deferred to permit the tabs to hold the break-away sections together in oriented chain effect in order to facilitate the performance of subsequent operations on the section. It is preferred that the weakened break facilitating and can body length defining lines be provided at individual can body lengths along the tube, but it will be apparent from the foregoing that said lines may be spaced along the tube so as to occur only at plural can body length defining intervals so that at each break away of a tube section the broken away section will comprise a plural can body length. It will be apparent also that even when the weakened lines are provided at individual can body length intervals along the tube, the breaking or breaking and cutting can be controlled to take place at selected line positions only so that each separated section will be made up of the desired plurality of can body lengths.

It is to be understood that these container lengths or sections are not completed. They may pass through other processes, which include the application of protective coatings and the decoration thereof which must be completed before the forming, beading, etc., operations. Also, after the individual container bodies have been formed, the container bodies may be reshaped at this time either back into their circular cross-section, or into square, pear-shaped, and other cross-sections.

In order to facilitate the securement of ends to the container bodies, it is necessary that the ends thereof be flanged. Also, when it is desired to strengthen the container bodies, they may be beaded. These operations will be performed in conventional container flanging and beading equipment.

Practically all containers are provided with an inside protective lacquer or enamel coating to either protect the can body from the action of the product packaged therein, or to protect the contents of the container from deterioration and contamination from the materials of the container. Accordingly, a final inside protective coating may be applied to the container bodies at this time.

Butt and lap welds are welds which are conventionally known in the art. In a butt weld, the two edges of a tube blank, for example, are brought together and welded. In a lap weld, the two edges are disposed in overlapping relation. However, since the present invention also relates to the use of a blap weld, the formation of a blap weld is described in detail here. In the formation of a blap weld, the edges of an unseamed tube are brought together in the same manner as in the formation of a lap weld. However, the metal at the edges of the blank is heated to a temperature immediately below that temperature which will produce the melting of the metal, a factor which will permit the effecting of a forged weld. The heated edges are then passed between a pair of forge rolls, and pressure is applied to the heated edges of the blank so as to result in the forge welding of the edge areas together. At the same time, the thickness of the joint or seam is reduced to approximately that of the thickness of the metal stock, and the weld interface is shifted from a position generally tangential to the tube, to a diagonal position. The tube in FIGURE 9 is referred to by the letter T, and the weld interface is referred to by the letter W. It will be apparent that the blap weld has advantages over both the lap weld and the butt weld. For example, the weld area lies within the general plane of the tube material, and thus the undesired extra thickness along the welded seam is prevented. On the other hand, the length of the weld interface is much greater than in the case of the butt weld, and thus the blap weld has all of the strength characteristics of a lap weld, with all of the attendant advantages of a butt weld.

It was earlier stipulated that to produce welded tubing according to any of the preferred methods herein disclosed, the starting coil or strip material is of circumferential width; that is, forming of a circular tube with abutting edges would give the desired tubular circumference. If then, such a tube prior to blap weld is held in overlapped relation, the actual circumferential dimension is reduced by an amount equal to the amount of overlap. Forge rolling of this overlapped metal would normally be expected to elongate the metal in the rolling direction which is in the seam direction in this case. Since the single thickness metal adjacent to the overlap is not so elongated, it would be expected that elongation of the seam as it occurred would either cause a strong ripple of the seam metal to develop or the elongation should cause a bowing of the tube with the weld seam on the convex side of any single curved length of tubing. If instead of blap welding, conventional lap or butt seam welding is used, bowing also occurs but in the opposite direction by reason of shrinkage of the metal along the welded seam after it has conformed dimensionally, while hot, to the rest of the tube.

One of the remarkable aspects of this invention is that, when properly practised, none of these anticipated difficulties are encountered. After forge rolling the hot, overlapped strip edges to a blap seam and rapidly cooling this, the tube circumference is not less by the amount of initial overlap but is of substantially the initial strip width. Likewise, the seam shows substantially no ripple nor does the tubing, in long lengths, exhibit any substantial bowing or curvature either convex or concave to the seam.

It may be deduced from this surprising result that forge rolling causes substantially little or no flow in the rolling direction but mostly lateral flow, thus resulting in a tubular circumference substantially equal to the initial strip width in spite of the initial overlap. This postulation would also explain the straightness of the welded tubing with no convex or concave seam tube curvature. Such small amount of lengthwise flow as occurs is sufficiently compensated for by the thermal shrinkage upon cooling of the seam.

In considering the flow diagram of FIGURES 10, 10A and 10B it will be apparent that there are many forms of the process. While all of the various possibilities are considered important, only several of the embodiments are illustrated. A first embodiment of the invention is illustrated in FIGURE 1. In the embodiment of FIGURE 1 the metal stock, which is referred to by the letter S, is provided in coil form, and is mounted on a shaft 10 from which it may be paid out at the desired rate. The various conditions of the metal stock have been described above, and further description here is believed to be unnecessary. It is, however, pointed out that the width of the metal stock S is approximately that of the circumference of the tube which is intended to be formed.

While still in its flat state, the metal stock S is passed between a pair of rollers 11, 12. The rollers 11, 12 are provided with cutters 13, 14, respectively, which are so positioned and timed that they engage the opposite surfaces of the strip S simultaneously. The cutters 13 serve to score the stock S from points adjacent the edges.

As indicated above, the scoring may be formed on one side only of the stock S, and accordingly, either the cutter 13 or the cutter 14 may be eliminated. On the other hand, suitable perforating means may be utilized, if desired.

After the stock is weakened by the formation of transverse score lines, such as score lines 15, the stock S may pass into a shaping channel 16, so that the stock S is gradually shaped from its flat state to an unseamed tubular state. The channel 16 may be of conical, exponential, or other similar shapes. It is to be understood that during the shaping of the stock S into the tube form, it is preferred that this be accomplished for circular tubing without overforming so that the cross-sectional shape is attained and held while the material is still elastically stressed, that is springback would occur but is prevented by the tube shaping, driving and/or guiding means. In cases where the final tubing is to be of square, rectangular or elliptical shape such overforming at corners or sharp curves to allow for springback is of course necessary.

In the formation of the desired welded seam, it is necessary that the edges of the unseamed tube converge to define a V area 17. In order to accomplish this, it is necessary to control both vertically and horizontally the feeding of the edges. The simpliest type of guide is a center guide 18, which is illustrated. The guide 18 should be formed of an insulting material or formed of two metal plates which are joined together in insulated relation. Other types of guiding means, including Z-bars, hourglass rolls, etc., may be provided.

At this time, it is pointed out that depending on whether a butt, lap or blap weld is to be formed the edges of the unseamed tube are guided either into abutting relation or overlapping relation. This is merely a question of guidance, and no specific details of the guiding thereof are illustrated. Furthermore, for descriptive purposes, it will be assumed that the weld which is being formed will be a blap weld, although the operation of the invention will be the same with the exception of the alignment of the edges of the unseamed tube.

The heating of the edges of the unseamed tube in the V area 17 is accomplished by a high frequency generator 19, having leads 20 which are connected to contacts 21 disposed on opposite sides of the gap between the edges of the unseamed tube. The contacts 21, which are in the form of electrodes, may either be of the capacitive type or the conductive type. The general requirements of the two types of heating means have been set forth above, and expansion of the description of the heating means is believed to be unnecessary.

At this time, it is pointed out that normally a horn 22 will be disposed within the seamed tube, which is referred to by the letter T, for the purpose of supporting and guiding the tube T. The horn 22 is supported by a suitable supporting shaft 23 which passes through the open end of the stock S in advance of the formation of the unseamed tube.

In accordance with the invention, the heated seam is forged at approximately the apex of the V area 15. The simplest form of forging means will include an inner forging roll 24 and an outer forging roll 25. The inner forging roll 24 may be suitably supported by various means including the use of the horn 22 as a support. The outer forging roll 25 will also be suitably supported, but will be movable in order that a pressure may be exerted onto the seam of the tube T.

In the case of a butt weld, the forging rolls 24 and 25 will exert only sufficient pressure to eliminate that metal which normally protrudes from a butt weld due to the endwise compressive forces applied to the edge portions of the tube during the welding operation. On the other hand, the forging rolls 24 and 25 will apply a sufficient pressure to the overlapped edge portions in the formation of a lap weld to assure the proper formation of the weld. In the formation of a blap weld, as described above, the forging rolls 24 and 25 will exert a sufficient pressure on the hot metal to deform the metal.

An external spray tube 26 is disposed rearwardly of the forging rolls 24 and 25. An internal spray tube 26' is carried by the horn 22 in the general vicinity of the contacts 21. The spray tubes 26 and 26' are intended to spray onto the welded seam either liquid or gas which may function to either cool the welded seam or to prevent oxidation of the welded seam, and in many instances, will serve to do both. The general function of the sprays has been described above.

Doughnut drive wheels 27 mounted on opposite sides of the tube T are shown schematically in FIGURE 1 as functioning to drive the tube over the horn 22. It is to be understood that driving belts or other devices may be employed for this purpose.

It may be desired to side stripe the welded seam while the container bodies remain in the form of tubular container body stock, such as the tube T. An outside spray tube 28 and an inside spray tube 29 have been illustrated for this purpose. The inside spray tube 29 is illustrated as being supported by the horn 22. Of course, only one of the two spray tubes 28 and 29 need be utilized, although it is proposed to utilize both at the same time, if desired.

After the tube T passes beyond the horn 22 and at the end of the horn, there are provided suitable supporting rolls 30 which support the tube T against vertical movement. A belt 31 is disposed in alignment with the path of travel of the tube T rearwardly of the support rollers 30. The belt 31 is in the form of an endless belt and is supported by suitable rollers, such as the roller 32. It is to be understood that the belt 31 is to be driven in the same general direction of travel as the tube T. However, the belt 31 slopes upwardly and rearwardly, so that when the tube T engages the belt 31, the tube T is forced upwardly. As a result, and due to the formation of the weakened lines 15, the individual container bodies, which are referred to by the letters C, are pulled apart with the exception of a connecting strip 33 along the welded seam. In this manner, the individual container bodies C are defined.

Reference is now made to FIGURE 2 wherein there are shown the details of a tail end of a slight modification of the can line of FIGURE 1. The tube T passes between the supporting rolls 30 and engages the belt 31 in the manner described with respect to FIGURE 1. However, as the interconnected container bodies C pass up along the upper run of the endless conveyor belt 31, a knife 34 is reciprocated in timed relation to engage the connecting strip 33 and to shear the same so that the container bodies C will be independent of each other. The knife 34 is reciprocated by means of a cylinder 35 which may be controlled in any desired manner.

Reference is now made to FIGURE 3 in particular, wherein a modified form of tube shaping means is illustrated. In lieu of the channel 16, it is proposed to utilize an endless belt 36 for the purpose of shaping the stock S into the unseamed tube shape. The lower run of the endless belt 36 passes around a concave roller 37 which has cooperating therewith a convex roller 38 to provide for the initial curvature of the stock S. The belt 36 also passes through a plurality of hourglass rolls 39 which are disposed in a generally rectilinear pattern so as to define substantially a complete circle. As the belt 36 progressively curves from its flat state to a generally circular state, the stock S is also shaped so it assumes the unseamed tube shape. It is to be pointed out that other formers may be used in conjuction with the belt 36, but have been omitted for purposes of clarity.

Reference is now made to FIGURE 4 of the drawings wherein a second form of can line is schematically illustrated. The strip S is provided in coil form and is mounted on a pay-off shaft 10. The strip S passes through a series of sets 41, 42, 43 of rollers, each of which sets includes complementary concave and convex rollers to initiate the forming thereof into a rectangular or square cross sectional tubular shape. The partially shaped strip S next passes through a section of V rollers 44 wherein the strip S is overformed beyond the intended cross section. The formed strip is then permitted to spring back to the intended cross section, which shape is maintained by a set of rectangularly arranged cylindrical rollers 45. The rollers 45 cooperate with a horn 46 which disposed within the unseamed tube T and is supported by a shaft 47 which opens through the tube as it is being shaped.

In the formation of the weld of the seam in the tube T, it is again necessary to maintain a V area which is referred to by the numeral 49. The opposed edges of the unseamed tube are separated by means of any suitable spacer, such as the spacing wheel 50. On the other hand, the edges of the unseamed tube are brought together into the necessary relationship at the apex of the V area 49 by suitable rollers 51.

In order to heat the edge portions of the unseamed tube T to produce the necessary heat for forming the welded seam, a high frequency generator 52 is provided. The generator 52 is provided with leads 53 which extend to electrode type contacts 54. The electrodes 54, like the electrodes 21, may either be of the capacitive or conductive type. Also, the output of the generator 52 may be of the type for the particular requirements of the welding operation so that the heating may be either capacitive or conduction, in the manner described above where the various forms of heating were discussed.

The welded seam is forged substantially at the apex of the V area by a pair of forge rollers 55 and 56 which correspond to the forge rollers 24 and 25, respectively. An exterior spray pipe 57 is disposed rearwardly of the forging rollers 55 and 56 and an interior spray pipe 57' is carried by the horn 46 in the vicinity of the contacts 54 for the purpose of treating the welded seam to cool the seam and/ or prevent oxidation and discoloration of the tube T in the weld area.

It is to be understood that the welded side seam may be formed along one corner of the tube rather than along the center of one panel as in FIGURE 4, if desired.

A pair of doughnut drive wheels 58 schematically shown in FIGURE 4 engage the tube T for the purpose of driving the tube T along the horn 48. Also, the drive means could be in the form of a belt, as previously mentioned, and running through a preformed opening and engaging the tube T.

When it is desired to side stripe the welded seam a pair of spray tubes 59 and 60 are provided. The spray tubes 59 and 60 correspond to the spray tubes 28 and 29 and will spray the desired coating over the weld area.

An apparatus for applying a decorative and/or protective coating to the welded tube T is generally referred to by the numeral 61 and is illustrated in box form. As previously described, the apparatus 61 may include interior and exterior spraying devices or interior and exterior coating rolls, and printing rolls. Also, any other means known in the container manufacturing art for applying either a protective coating or a decorative coating may be utilized here.

The tube T is in the form of a tubular container stock which must now be divided into individual container bodies. The individual container body, which is referred to by the letter C, is cut from the tube T by means of a high speed saw, generally referred to by the numeral 62. The saw is illustratively shown as including a saw blade 63 which is driven by an electric motor 64 and which is supported by a pivotally mounted bracket 65 from a traveling carriage 66. It will be understood that during the cut-off operation, the saw blade 63 will travel in the same direction as the tube T and at the same rate of speed. Thus, the saw blade 63 is reciprocated back and forth as well as being swung transversely of the tube T to form the cut-off operation. Other types of traveling cut-off means, including a shear, knife, etc., may be used, or high speed cutters of the type previously described may be used here.

Reference is now made to FIGURE 5, wherein another form of can line is illustrated. The stock S is again provided in coil form and is mounted on a pay-off shaft 10. The stock S is provided with weakening lines 15 at can body intervals by means of cutters 13 and 14 carried by rollers 11 and 12. The weakened stock S is then urged into tubular shape by means of an endless belt 67, the upper run of which passes through a shaping channel 68 so as to shape the stock S into tubular form and hold it in circular cross-sectional shape so that springback cannot occur. The belt 67 is also supported by suitable rollers 69 and 70 which are suitably positioned and may be varied as is found necessary.

Opposed edges of the unseamed tube T are maintained in spaced relation by a spacer which is illustratively shown in the form of a spacing wheel 71. Rearwardly of the spacer 71, the edges of the unseamed tube T are disposed in a V-shaped pattern identified by the numeral 72. This is accomplished by means of hourglass-shaped rollers 73 which cooperate in the shaping of the belt 67.

The edges of the unseamed tube T are heated to the desired welding temperature in the weld area by a pair of electrode type contacts 74 which are connected to a high frequency generator 75 by means of leads 76. As previously described, the electrodes 74 may be either of the capacitative or the conductive type and the output of the high frequency generator 75 will be that necessary for the particular heating operation.

A horn 77 which conforms to the general shape of the tube T, as it is formed, is positioned within the tube T. The horn 77 is supported by a shaft 78.

A pair of forging rolls 79 and 80 are disposed at the apex of the V area 72. The forging rolls 79 and 80 function to forge the welded seam in the manner described with respect to the forging rollers 24 and 25.

An exterior spray tube 81 is disposed rearwardly of the forging rollers 79 and 80 and an interior spray tube 81 is carried by the horn 77 in the general vicinity of the contacts 74 for the purpose of spraying liquid or gases onto the weld area so that the weld areas may be cooled and/or treated to prevent oxidation and discoloration of the weld area, in the previously described manner.

Subsequent to the forming of the welded seam of the tube T, it may be desired to reshape the tube T to have a cross-section other than circular. In order to accomplish this, reshaping rollers, such as those illustrated in FIGURE 4, may be provided. These rollers will include a first set of concave rollers 82 which are shallower than the curvature of the tube T. This results in a flattening out of the tube T. The tube T then passes through a set of cylindrical rollers 83 which transform the cross-section of the tube T to a generally square cross-section. Next, the tube T passes through a set of convex rollers 84 which change the shape of the tube T to one with indented sides thus overforming the tube. The tube T, when released by the rollers 84, will spring back and retain its square shape. This is maintained by a set of rollers 85 which are of a cylindrical configuration.

The reforming rollers when driven supplement the action of the belt 67 in driving the tube T.

After the tube T has been reformed, it is passed through an apparatus which is schematically illustrated in the form of a box, and is generally referred to by the numeral 86. The apparatus 86 corresponds to the apparatus 61 and is in the form of an apparatus for post-decorating and applying a protective coating to the tube T which functions as a tubular container-body stock. The apparatus 86 may include interior and exterior spraying devices, internal and external coating rolls and/or printing rolls.

After the tube T passes beyond the horn 77, it passes between a pair of positioning rolls 87 which are disposed above and below the tube T. A break-off roll 88 is disposed generally in alignment with the tube T so that the tube T is forced out of its normal line of travel by the break-off roll 88, the breaking off of the individual container bodies C being along the weakened lines 15. The container bodies C remain attached to each other by means of a connecting strip 89 which extends along the welded seam area.

Reference is now made to the can line of FIGURE 6, wherein the stock S is again provided in coil form and is mounted on a pay-off shaft 10. The strip S passes between a pair of rollers 11 and 12 which are provided with cooperating cutters 13 and 14 to provide weakening score lines 15 along the stock S at container-body length intervals.

The stock S then passes into a tube shaping channel 16 so that the stock S assumes its tubular shape and held there by the channel 16 and, further along by the hour glass rollers 91 without overforming or without allowing for springback.

The edges of the unseamed tube are maintained in spaced relation and in alignment with each other in any desired manner, including the use of a spacer wheel 89'. In this manner, the edges of the unseamed tube T will define a V area 90. The edges of the unseamed tube 90 are brought together at the apex of the V area in the desired relation by means of a pair of hour glass rollers 91.

The edge portions of the unseamed tube T are heated so that they reach the desired welding temperature at approximately the apex of the V area by means of at least one induction coil 92 which encircles the unseamed tube T. The induction coils 92 are connected by means of leads 93 to high frequency generators 94. It is to be understood that the high frequency generators 94 will have the necessary power output and will provide current at the desired frequency for the efficient heating of the edges of the unseamed tube T to the necessary welding temperature. Frequencies of radio frequency are useful in this type of heating, as previously described.

A pair of forging rollers 95 and 96 are disposed at generally the apex of the V area 90 for forging and refining the metal of the seam. When a blap weld is being formed, the forging pressure will be such as to reform the metal and to flatten the metal so that the thickness of the overlapped edge portions will be reduced to substantially the thickness of a single portion and the interface of the weld will be shifted from a generally tangential position to a diagonal position. The forging roll 95, which is disposed within the tube T, may be supported from the horn 97, which is supported within the tube T and facilities the shaping and supporting of the tube T. The horn 97 is supported by a shaft 98.

An exterior spray tube 99 is positioned rearwardly of the forging rollers 95 and 96 and an interior spray tube 99 is carried by the horn 97 in the general vicinity of the induction coils 92 for spraying liquids and gases onto the weld area. The liquids and gases will serve to either cool the welded area or prevent oxidation and discoloration, or both.

The feeding of the tube T is accomplished by means of the schematically illustrated pair of doughnut wheels 100 which are driven. Although one pair only of doughnut wheels 100 have been illustrated, additional pairs may be provided if desired. Also, if desired, the doughnut drive wheels 100 could be replaced by a drive belt which conforms generally to the shape of the Tube T as before stated.

The seamed tube T passes through an apparatus 101 for post-decorating and applying a protective coating to the tube T, which is in the form of a tubular container body stock. The apparatus 101 is illustrated in the form of a box, and may include interior and exterior spraying devices, internal and external coating rolls and/or printing rolls.

After the post decorative and protective coating operation, the Tube T passes through a series of rollers 102 which are arranged with respect to each other to flatten and twist the tube T after it leaves the horn 97. The action of the rollers 102 is to stress the tube T so as to effect the breaking apart of the tube T along the weakened lines 15 to provide a plurality of individual container bodies C which are connected together only by connecting strips such as the connecting strips previously described. The individual container bodies C are then separated from one another by the cutting of the connecting strips in any desired manner, including utilizing the rotary cutter illustrated and generally referred to by the numeral 103. The rotary cutter 103 includes a supporting shaft 104 which is driven and which carries a cutter mounting block 105. The cutter mounting block 105 has flat sides which correspond generally to the length of one of the container bodies C. A plurality of spaced knives or other types of cutters 106 are carried by the block 105 at the intersections of the sides thereof. Thus, the cutters 106 correspond in location to the connecting strips between the container bodies C.

Reference is now made to FIGURE 7, wherein a modified form of tube shaping mechanism is provided for the can line of FIGURE 6. If desired, the channel 16 may be omitted, and the stock S shaped in its tubular form utilizing an endless belt, such as the endless belt 36. The forward portion of the endless belt 36 is supported by a concave roller 37 which cooperates with a convex roller 38 to start the shaping of the strip S into its tubular form. The endless belt 36 also passes around a plurality of concave rollers 39 which combine to define a generally circular opening through which the belt 36 and the strip S pass, thus assuring the generally circular shape of the Tube T.

In FIGURE 8 a modified form of tube breaking mechanism is shown. This tube breaking mechanism is generally referred to by the numeral 110 and includes a support plate 111 carried by support rods 112. The support rods 112 are suitably mounted in a manner not shown for reciprocation in timed relation to the movement of the welded tube T with the tube passing through a central opening (not shown) in the support plate 111. A plurality of radially extending clamping jaws 113 are suitably mounted on the support plate 111 for radial movement. Suitable means (not shown) will be provided for moving the jaws radially inwardly and outwardly in timed relation to the movement of the tube T to momentarily clamp the tube rearwardly of each of the weakened break lines 15. Simultaneously with the gripping of the tube, the tube is struck by a lobe 114 on a wheel 115, which is also driven in timed relation to the movement of the tube, to break the can bodies C from each other. The can bodies will either be partially separated from each other and remain connected together by a tab extending along the welded seam or entirely separated depending upon the force of the blow impacted by the wheel 115. The foregoing is only an example of apparatus for accomplishing this result.

It is pointed out at this time that the various can lines illustrated and described may have certain apparatus thereof omitted, as is desired. For example, it may be found advisable to eliminate the side striping operation, in which event, the special spray tubes or other devices utilized for side striping may be eliminated from the can line, or not utilized. Also, the various apparatuses for post-decorating and applying the protective coating to the tube T may be eliminated or not used when not desired. In additional, as pointed out above, certain of the apparatus illustrated and described may be replaced by other apparatus which may produce the desired results.

It is to be understood that in accordance with the flow diagram of FIGURES 10, 10A and 10B the container bodies C will be additionally treated after passing from the illustrated can lines of FIGURES 1, 4, 5 and 6. No attempt has been made to illustrate these further steps in that they are performed by conventional equipment.

From the foregoing, it will be seen that novel and advantageous provision has been made for carrying out the desired end. However, attention is again directed to the fact that variations may be made in the example processes and apparatuses disclosed herein departing from the spirit and scope of the invention, as defined in the appended claims.

We claim:

1. A process of producing coated tubular welded seam can bodies comprising the steps of providing sheet metal in strip form and substantially of single can circumference width, shaping the sheet metal into tubular shape, guiding the tubular shaped sheet metal with the edge portions thereof being first disposed in spaced relation and then converging into overlapped relation, moving the tubular shaped strip through a welding zone and there electrically heating the edge portions of the tubular shaped sheet metal to a forge welding temperature as edge portions of the tubular shaped sheet metal converge into overlapping relation and forging the heated overlapped edge portions of the moving tubular shaped sheet metal to effect a welding together of opposed surfaces of the edge portions to form a welded seam tube and reduce the the thickness of the metal along the seam to substantially the original thickness of the sheet metal and provide a seam weld wherein the original weld interface when considered in transverse section is rotated to a diagonal position relative to the surfaces of the sheet metal and the weld extends the full width of the interface, fluid treating the metal in the welding zone to reduce oxidation and discoloration of the metal and cool the welded seam area immediately subsequent to the forging operation to minimize distortion of the welded seam, applying a coating on at least a portion of at least one surface of the welded tube, and separating the welded tube into predetermined lengths.

2. The process of Claim 1 wherein the shaping of the sheet metal includes guiding the strip into a desired tubular shape and confining it in said shape while preventing springback of the strip towards its initial strip form.

3. The process of Claim 1 wherein the shaping of the sheet metal is attended by an overforming of the strip and permitting the overformed tubular strip section to spring back and remain form retaining in the desired tubular shape.

4. The process of Claim 1 wherein the electrical heating of the edge portions of the tubular shaped strip is by use of high frequency heating (10-500 KC) with inductive coupling.

5. The process of Claim 1 wherein the electrical heating of the edge portions of the tubular shaped strip is by use of high frequency heating (10-500 KC) with resistive coupling.

6. The process of Claim 1 wherein the electrical heating of the edge portions of the tubular shaped strip is by use of high frequency heating (10-500 KC) with capacitative coupling.

7. The process of Claim 1 wherein the fluid treating of the metal in the welding zone is by way of a liquid spray applied externally of the tube.

8. The process of Claim 1 wherein the fluid treating of the metal in the welding zone is by way of application of an inert gas externally of the tube.

9. The process of Claim 1 wherein the fluid treating of the metal in the welding zone is by way of application of an inert gas internally of the tube.

10. The process of Claim 1 wherein the fluid treating of the metal in the welding zone is by way of a liquid spray applied externally of the tube and by application of an inert gas internally of the tube.

11. The process of Claim 1 wherein the coating application on at least one surface of the welded tube constitutes a striping extending along and over the seam line.

12. The process of Claim 1 wherein the coating application on at least one surface of the welded tube comprises an over-all coating applied interiorly of the tube.

13. The process of Claim 1 wherein the coating application on at least one surface of the welded tube comprises a decorative coating applied exteriorly of the tube.

14. The process of Claim 1 wherein the coating application on at least one surface of the welded tube comprises a striping extending along and over the seam line interiorly of the tube, an over-all coating applied interiorly of the tube, and a decorative coating applied exteriorly of the tube.

15. The process of Claim 1 wherein the separation of the welded tube into predetermined lengths is brought about by providing in the metal strip from which the tube is formed weakened break facilitating lines extending across the strip at a selected unit multiple of can body length intervals, and breaking the tube at certain selected lines at which the strip was weakened to partially separate selected unit multiple of can body length and leave unbroken tabs connecting said partially separated lengths.

16. A process of producing coated tubular welded seam can bodies comprising the steps of providing sheet metal in strip form and substantially of single can circumference width, shaping the sheet metal into tabular shape, guiding the tubular shaped sheet metal with the edge portions thereof being first disposed in spaced relation and then converging into overlapped relation, moving the tubular shaped strip through a welding zone and there electrically heating the edge portions of the tubular shaped sheet metal to a forge welding temperature as edge portions of the tubular shaped sheet metal converge into overlapping relation and forging the heated overlapped edge portions of the moving tubular shaped sheet metal to effect a welding together of opposed surfaces of the edge portions to form a welded seam tube and reduce the thickness of the metal along the seam to substantially the original thickness of the sheet metal and provide a seam weld wherein the original weld interface when considered in transverse section is rotated to a diagonal position relative to the surfaces of the sheet metal and the weld extends the full width of the interface, fluid treating the metal in the welding zone to reduce oxidation and discoloration of the metal and cool the welded seam area immediately subsequent to the forging operation to minimize distortion of the welded seam, applying a coating on at least a portion of at least a portion of at least one surface of the welded tube, and separating the welded tube into predetermined lengths, the separation of the welded tube into predetermined lengths being brought about by providing in the metal strip from which the tube is formed weakened break facilitating lines extending across the strip at a selected unit multiple of the can body length intervals, and breaking the tube at certain selected lines at which the strip was weakened to partially separate selected unit multiple of can body length and leave unbroken tabs connecting said partially separated lengths, the transverse weakened lines being score lines terminating just short of the side edges of the metal strip to avoid extension through the weld seam area in the tube, said lines being graduated in depth from a central portion of the strip toward each side to provide in each welded tube score line a deepest most readily ruptured portion at a point diametrically opposite the welded seam.

17. The process of Claim 16 wherein the separation of the partially separated lengths is completed by separtion through the connecting tabs.

18. A process of producing coated tubular welded seam can bodies comprising the steps of providing sheet metal in strip form and of .010″ maximum thickness and substantially of single can circumference width, weakening the strip at a selected unit multiple of can body length intervals transversely of the strip, guiding the strip into a desired tubular shape and confining it in said shape while preventing spring back of the strip towards its initial strip form, guiding the tubular shaped strip to present the edge portions thereof first in spaced relation and converging into over lapped relation with the width of overlap being no greater than five times the thickness of the sheet metal, moving the tubular shaped strip through a welding zone and there electrically heating the edge portions of the tubular shaped strip to a forge welding temperature as edge portions of the tubular shaped strip converge into overlapping relation and forging the heated overlapped edge portions to effect a welding together of opposed surfaces of the edge portions to form a welded seam tube and reduce the thickness of the metal along the seam to substantially the original thickness of the sheet metal and provide a seam weld wherein the original weld interface when considered in transverse section is rotated to a diagonal position relative to the surfaces of the sheet metal and the weld extends the full width of the interface, fluid treating the metal, in the welding zone to reduce oxidation and discoloration of the metal and cool the welded seam area immediately subsequent to the forging operation to minimize distortion of the welded seam, applying to the tube a driving force effective to impart the before mentioned sheet metal movement, applying a coating on at least a portion of at least one surface of the welded tube, breaking the tube at certain selected locations at which the strip was weakened to partially separate selected unit multiple of can body length and leave unbroken tabs connecting said partially separated lengths, separating said lengths through said tabs, and reshaping the separated lengths.

19. A process of producing coated tubular welded seam can bodies comprising the steps of providing sheet metal in strip form and .010′ maximum thickness and substantially of single can circumference width, weakening the strip at a selected unit multiple of can body length intervals transversely of the strip, driving the strip while guiding the strip into a desired tubular shape and confining it in said shape while preventing spring back of the strip towards its initial strip form, guiding the tubular shaped strip to present the edge portions thereof first in spaced relation and then converging into overlapped relation with the width of overlap being no greater than five times the thickness of the sheet metal, moving the tubular shaped strip through a welding zone and there electrically heating the edge portions of the tubular shaped strip to a forge welding temperature as edge portions of the tubular shaped strip converge into overlapping relation, and forging the heated overlapped edge portions to effect a welding together of opposed surfaces of the edge portions to form a welded seam tube and to reduce the thickness of the metal along the seam to substantially the original thickness of the sheet metal and provide a seam weld wherein the original weld interface when considered in transverse section is rotated to a diagonal position relative to the surfaces of the sheet metal, and the weld extends the full width of the interface, fluid treating the metal in the welding zone to reduce oxidation and discoloration of the metal and cool the welded seam area immediately subsequent to the forging operation to minimize distortion of the welded seam, applying to the tube a driving force effective to supplement the before mentioned sheet metal movement, applying a coating on at least a portion of at least one surface of the welded tube, breaking the tube at certain selected locations at which the strip was weakened to partially separate selected unit multiple of can body length and leave unbroken tabs connecting said partially separated lengths, separating said lengths through said tabs, and reshaping the separated lengths.

20. A process of producing coated tubular welded seam can bodies comprising the steps of providing sheet metal in strip form and of .010" maximum thickness and substantially of single can circumference width, weakening the strip at a selected unit multiple of can body length intervals transversely of the strip, guiding the strip into a desired tubular shape and confining it in said shape while preventing springback of the strip towards its initial strip form, guiding the tubular shaped strip to present the edge portions thereof first in spaced relation and then converging into overlapped relation with the width of overlap being no greater than five times the thickness of the sheet metal, moving the tubular shaped strip through a welding zone and there electrically heating the edge portions of the tubular shaped strip to a forge welding temperature as edge portions of the tubular shaped strip converge into overlapping relation and forging the heated overlapped edge portions to effect a welding together of opposed surfaces of the edge portions to form a welded seam tube and reduce the thickness of the metal along the seam to substantially the original thickness of the sheet metal and provide a seam weld wherein the original weld interface when considered in transverse section is rotated to a diagonal position relative to the surfaces of the sheet metal, and the weld extends the full width of the interface, fluid treating the metal in the welding zone to reduce oxidation and discoloration of the metal and cool the welded seam area immediately subsequent to the forging operation to minimize distortion of the welded seam, applying to the tube a driving force effective to impart the before mentioned sheet metal movement, applying a coating on at least a portion of at least one surface of the welded tube, breaking the tube at certain selected locations at which the strip was weakened to partially separate selected unit multiple of can body length and leave unbroken tabs connecting said partially separated lengths, and reshaping said connected lengths including the separation of said lengths through the tabs.

21. A process of producing decorated coated tubular welded seam can bodies comprising the steps of providing sheet metal in strip form and of .010 inch maximum thickness and substantially of single can circumference width, weakening the strip at a selected unit multiple of can body length intervals transversely of the strip, driving the strip while guiding the strip into a desired tubular shape and confining it in said shape while preventing spring back of the strip towards its initial strip form, guiding the tubular shaped strip to present the edge portions thereof first in spaced relation and then converging into overlapped relation with the width of overlap being no greater than five times the thickness of the sheet metal, moving the tubular shaped strip through a welding zone and there electrically heating the edge portions of the tubular shaped strip to a forge welding temperature as edge portions of the tubular shaped strip converge into overlapping relation and forging the heated overlapped edge portions to effect a welding together of opposed surfaces of the edge portions to form a welded seam tube and reduce the thickness of the metal along the seams to substantially the original thickness of the sheet metal and provide a seam weld wherein the orginal weld interface when considered in transverse section is rotated to a diagonal position relative to the surfaces of the sheet metal, and the weld extends the full width of the interface, fluid treating the metal in the welding zone to reduce oxidation and discoloration of the metal and cool the welded seam area immediately subsequent to the forging operation to minimize distortion of the welded seam, applying to the tube a driving force effective to supplement the before-mentioned sheet metal movement applying a coating on at least a portion of at least one surface of the welded tube, breaking the tube at certain selected locations at which the strip was weakened to partially separate selected unit multiple of can body length and leave unbroken tabs connecting said partially separated lengths, separating said lengths through said tabs, applying decorative matter exteriorly on the separated lengths, and reshaping the separated lengths.

22. A process of producing decorated coated tubular welded seam can bodies comprising the steps of providing sheet metal in strip form and of .010 inch maximum thickness and substantially of single can circumference width, weakening the strip at a selected unit multiple of can body length intervals transversely of the strip, driving the strip while guiding the strip into a desired tubular shape and confining it in said shape while preventing springback of the strip towards its initial strip form, guiding the tubular shaped strip to present the edge portions thereof first in spaced relation and then converging into overlapped relation with the width of overlap being no greater than five times the thickness of the sheet metal, moving the tubular shaped strip through a welding zone and there electrically heating the edge portions of the tubular shaped strip to a forge welding temperature as edge portions of the tubular shaped strip converge into overlapping relation and forging the heated overlapped edge portions to effect a welding together of opposed surfaces of the edge portions to form a welded seam tube and reduce the thickness of the metal along the seam to substantially the original thickness of the sheet metal and provide a seam weld wherein the original weld interface when considered in transverse section is rotated to a diagonal position relative to the surfaces of the sheet metal, and the weld extends the full width of the interface, fluid treating the metal in the welding zone to reduce oxidation and discoloration of the metal and cool the welded seam area immediately subsequent to the forging operation to minimize distortion of the welded seam, applying a coating on at least a portion of at least one surface of the welded tube, breaking the tube at certain selected locations at which the strip was weakened to partially separate selected unit multiple of can body length and leave unbroken tabs connecting said partially separated lengths, separating said lengths through said tabs, applying decorative matter exteriorly on the separated lengths, and reshaping said separated lengths.

23. A process of producing decorated coated tubular welded seam can bodies comprising the steps of providing sheet metal in strip form and of .010 inch maximum thickness and substantially of single cam circumference width, weakening the strip at a selected unit multiple of can body length intervals transversely of the strip, driving the strip while guiding the strip into a desired tubular shape and confining it in said shape while preventing springback of the strip towards its initial strip form, guiding the tubular shaped strip to present the edge portions thereof first in spaced relation and then converging into overlapped relation with the width of overlap being no greater than five times the thickness of the sheet metal, moving the tubular shaped strip through a welding zone and there electrically heating the edge portions of the tubular shaped strip to a forge welding temperature as edge portions of the tubular shaped strip converge into overlapping relation and forging the heated overlapped edge portions to effect a welding together of opposed surfaces of the edge portions to form a welded seam tube and reduce the thickness of the metal along the seam to substantially the original thickness of the sheet metal and provide a seam weld wherein the original weld interface when considered in transverse section is rotated to a diagonal position relative to the surfaces of the sheet metal, and the weld extends the full width of the interface, fluid treating the metal in the welding zone to reduce oxidation and discoloration of the metal and cool the welded seam area immediately subsequent to the forging operation to minimize distortion of the welded seam, applying to the tube a driving force effective to supplement the before-mentioned sheet metal movement, reforming the tube to a cross section other than the original cross section of the tube, applying a coating on at least a portion of at least one surface of the welded tube, breaking the tube at certain selected locations at which the strip was weakened to partially separate selected unit multiple of can body lengths, separating said lengths through said tabs, and applying decorative matter exteriorly on said lengths.

24. A process of producing decorated coated tubular welded seam can bodies comprising the steps of providing sheet metal in strip form and of .010 inch maximum thickness and substantially of single can circumference width, forming the strip into a desired tubular shape by overforming the strip and permitting it to spring back to and remain form retaining in said desired tubular shape, guiding the tubular shaped strip to present the edge portions thereof first in spaced relation and then converging into overlapped relation with the width of overlap being no greater than five times the thickness of the sheet metal, moving the tubular shaped strip through a welding zone and there electrically heating the edge portions of the tubular shaped strip to a forge welding temperature as edge portions of the tubular shaped strip converge into overlapping relation and forging the heated overlapped edge portions to effect a welding together of opposed surfaces of the edge portions to form a welded seam tube and reduce the thickness of the metal along the seam to substantially the original thickness of the sheet metal and provide a seam weld wherein the original weld interface when considered in transverse section is rotated to a diagonal position relative to the surfaces of the sheet metal and the weld extends the full width of the interface, fluid treating the metal in the welding zone to reduce oxidation and discoloration of the metal and cool the welded seam area immediately subsequent to the forging operation to minimize distortion of the welded seam, applying to the tube a driving force effective to impart the before-mentioned sheet metal movement, applying a coating on at least a portion of at least one surface of the welded tube, severing the tube at a selected unit multiple of can body length intervals, applying decorative matter exteriorly on the can bodies, and reshaping the can bodies.

25. A process of producing decorated coated tubular welded seam can bodies comprising the steps of providing sheet metal in strip form and of .010 inch maximum thickness and substantially of single can circumference width, weakening the strip at a selected unit multiple of can body length intervals transversely of the strip, guiding the strip into a desired tubular shape and confining it in said shape while preventing springback of the strip towards its initial strip form, guiding the tubular shaped strip to present the edge portions thereof first in spaced relation and then converging into overlapped relation with the width of overlap being no greater than five times the thickness of the sheet metal, moving the tubular shaped strip through a welding zone and there electrically heating the edge portions of the tubular shaped strip to a forge welding temperature as edge portions of the tubular shaped strip converge into overlapping relation and forging the heated overlapped edge portions to effect a welding together of opposed surfaces of the edge portions to form a welded seam tube and reduce the thickness of the metal along the seam to substantially the orginal thickness of the sheet metal and provide a seam weld wherein the original weld interface when considered in transverse section is rotated to a diagonal position relative to the surfaces of the sheet metal and the weld extends the full width of the interface, fluid treating the metal in the welding zone to reduce oxidation and discoloration of the metal and cool the welded seam area immediately subsequent to the forging operation to minimize distortion of the welded seam, applying to the tube a driving force effective to impart the before-mentioned sheet metal movement, applying a coating on at least a portion of at least one surface of the welded tube, breaking the tube at certain selected locations at which the strip was weakened to partially separate selected unit multiple of can body length and leave unbroken tabs connecting said partially separated lengths, separating said lengths through said tabs, applying decorative matter exteriorly on said separated lengths, and reshaping said separated lengths.

26. The process of Claim 18 wherein the electrical heating of the edge portions of the tubular shaped strip is by use of high frequency heating (10-500 KC) with inductive coupling.

27. The process of Claim 19 wherein the electrical heating of the edge portions of the tubular shaped strip is by use of high frequency heating (10-500 KC) with inductive coupling.

28. The process of Claim 20 wherein the electrical heating of the edge portions of the tubular shaped strip is by use of high frequency heating (10-500 KC) with inductive coupling.

29. The process of Claim 21 wherein the electrical heating of the edge portions of the tubular shaped strip is by use of high frequency heating (10-500 KC) with inductive coupling.

30. The process of Claim 22 wherein the electrical heating of the edge portions of the tubular shaped strip is by use of high frequency heating (10-500 KC) with inductive coupling.

31. The process of Claim 23 wherein the electrical heating of the edge portions of the tubular shaped strip is by use of high frequency heating (10-500 KC) with inductive coupling.

32. The process of Claim 24 wherein the electrical heating of the edge portions of the tubular shaped strip is by use of high frequency heating (10-500 KC) with inductive coupling.

33. The process of Claim 25 wherein the electrical heating of the edge portions of the tubular shaped strip is by use of high frequency heating (10-500 KC) with inductive coupling.

34. The process of Claim 18 wherein the electrical heating of the edge portions of the tubular shaped strip is by use of high frequency heating (10-500 KC) with resistive coupling.

35. The process of Claim 19 wherein the electrical heating of the edge portions of the tubular shaped strip is by use of high frequency heating (10-500 KC) with resistive coupling.

36. The process of Claim 20 wherein the electrical heating of the edge portions of the tubular shaped strip is by use of high frequency heating (10-500 KC) with resistive coupling.

37. The process of Claim 21 wherein the electrical heating of the edge portions of the tubular shaped strip is by use of high frequency heating (10-500 KC) with resistive coupling.

38. The process of Claim 22 wherein the electrical heating of the edge portions of the tubular shaped strip is by use of high frequency heating (10-500 KC) with resistive coupling.

39. The process of Claim 23 wherein the electrical heating of the edge portions of the tubular shaped strip is by use of high frequency heating (10-500 KC) with resistive coupling.

40. The process of Claim 24 wherein the electrical heating of the edge portions of the tubular shaped strip is by use of high frequency heating (10-500 KC) with resistive coupling.

41. The process of Claim 25 wherein the electrical heating of the edge portions of the tubular shaped strip is by use of high frequency heating (10-500 KC) with resistive coupling.

42. The process of Claim 18 wherein the electrical heating of the edge portions of the tubular shaped strip is by use of high frequency heating (10-500 KC) with capacitative coupling.

43. The process of Claim 19 wherein the electrical heating of the edge portions of the tubular shaped strip is by use of high frequency heating (10-500 KC) with capacitative coupling.

44. The process of Claim 20 wherein the electrical heating of the edge portions of the tubular shaped strip is by use of high frequency heating (10-500 KC) with capacitative coupling.

45. The process of Claim 21 wherein the electrical heating of the edge portions of the tubular shaped trip is by use of high frequency heating (10-500 KC) with capacitative coupling.

46. A sheet metal strip for the production of can bodies having break facilitating score lines across the strip at break length defining intervals, each line terminating just short of the side edges of the strip and having a central portion more deeply scored than the line portions extending therefrom toward the strip side edges and substantially as deep as the thickness of the strip.

47. In the process of forming tubular welded can bodies, the steps of providing sheet metal in strip form and substantially of single can circumference width, shaping the sheet metal into tubular shape, guiding the tubular shaped sheet metal with the edge portions thereof being first disposed in spaced relation and then converging into overlapped relation, moving the tubular shaped strip through a welding zone and there electrically heating the edge portions of the tubular shaped sheet metal to a forge welding temperature as edge portions of the tubular shaped sheet metal converge into overlapping relation and forging the heated overlapped edge portions of the moving tubular shaped sheet metal to effect a welding together of opposed surfaces of the edge portions to form a welded seam tube and reduce the thickness of the metal along the seam to substantially the original thickness of the sheet metal and provide a seam weld wherein the original weld interface when considered in transverse section is rotated to a diagonal position relative to the surfaces of the sheet metal and the weld extends the full width of the interface.

48. A process of forming tubular welded seam can bodies comprising the steps of providing sheet metal in strip form, providing break facilitating score lines across the strip at break length defining intervals, each line terminating just short of the side edges of the strip and having a central portion more deeply scored than the line portions extending therefrom toward the strip side edges and substantially as deep as the thickness of the strip, whereby a resultant tube formed from the sheet metal will remain imperforate and unweakened along the welded seam and at the same time readily breakable when a bending stress is exerted thereon to separate the same into individual can bodies connected together by tabs extending along the welded seam, shaping the sheet metal into tubular shape, guiding the tubular shaped sheet metal with the edge portions thereof being first disposed in spaced relation and then converging into overlapped relation, moving the tubular shaped strip through a welding zone and there electrically heating the edge portions of the tubular shaped sheet metal to a forge welding temperature as edge portions of the tubular shaped sheet metal converge into overlapping relation and forging the heated overlapped edge portions of the moving tubular shaped sheet metal to effect a welding together of opposed surfaces of the edge portions to form a welded seam tube and reduce the thickness of the metal along the seam to substantially the original thickness of the sheet metal and provide a seam wherein the original weld interface when considered in transverse section is rotated to a diagonal position relative to the surfaces of the sheet metal, breaking the tube along said score lines at selected unit multiples of can body length with the lengths remaining connected together by tabs extending along the welded seams, and separating the lengths through the tabs.

49. A process of forming tubular welded seam can bodies comprising the steps of providing sheet metal in strip form and substantially of single can circumference width, providing break facilitating score lines across the strip at break length defining intervals, each line terminating just short of the side edges of the strip and having a central portion more deeply scored than the line portions extending therefrom toward the strip side edges and substantially as deep as the thickness of the strip, whereby a resultant tube formed from the sheet metal will remain imperforate and unweakened along the welded seam and at the same time readily breakable when a bending stress is exerted thereon to separate the same into individual can bodies connected together by tabs extending along the welded seam, shaping the sheet metal into tubular shape, guiding the tubular shaped sheet metal with the edge portions thereof being first disposed in spaced relation and then converging into overlapped relation, moving the tabular shaped strip through a welding zone and there electrically heating the edge portions of the tubular shaped sheet metal to a forge welding temperature as edge portions of the tubular shaped sheet metal converge into overlapping relation and forging the heated overlapped edge portions of the moving tubular shaped sheet metal to effect a welding together of opposed surfaces of the edge portions to form a welded seam tube and reduce the thickness of the metal along the seam to substantially the original thickness of the sheet metal and provide a seam wherein the original weld interface when considered in transverse section is rotated to a diagonal position relative to the surfaces of the sheet metal, breaking the tube along said score lines at selected unit multiples of can body length with the lengths remaining connected together by tabs extending along the welded seams, and separating the lengths through the tabs.